United States Patent [19]
Essig

[11] Patent Number: 5,500,892
[45] Date of Patent: Mar. 19, 1996

[54] ECHO CANCELLER

[75] Inventor: Daniel L. Essig, La Jolla, Calif.

[73] Assignee: Brooktree Corporation, San Diego, Calif.

[21] Appl. No.: 195,267

[22] Filed: Feb. 14, 1994

[51] Int. Cl.⁶ .................................................. H04B 3/23
[52] U.S. Cl. ........................ 379/345; 379/402; 379/406; 379/410
[58] Field of Search .................... 379/345, 402, 379/406, 407, 410, 411, 412

[56] References Cited

U.S. PATENT DOCUMENTS

| 4,677,668 | 6/1987 | Ardalan et al. | 379/410 |
|---|---|---|---|
| 4,686,703 | 8/1987 | Bruno et al. | 379/410 |
| 4,771,463 | 9/1988 | Beeman | 380/46 |
| 4,782,525 | 11/1988 | Sylvain et al. | 379/410 |
| 5,148,427 | 9/1992 | Buttle et al. | 379/411 |
| 5,272,695 | 12/1993 | Makino et al. | 379/410 |
| 5,371,789 | 12/1994 | Hirano | 379/410 |

FOREIGN PATENT DOCUMENTS

| 0320637 | 6/1989 | European Pat. Off. . |
| 0464500 | 1/1992 | European Pat. Off. . |

Primary Examiner—Jeffery A. Hofsass
Assistant Examiner—Jacques M. Saint-Surin
Attorney, Agent, or Firm—Ellsworth R. Roston; Charles H. Schwartz

[57] ABSTRACT

Analog signals representing individual digital values (+3, +1, −1, −3) of data pass through a telephone line to a receiver. These signals may first be provided in a pseudo random sequence. A linear echo canceller and a first adder at the receiver simultaneously eliminate, to some extent, echo signals resulting from second analog signals transmitted through the telephone line by the receiver. A non-linear echo canceller and a second adder further significantly reduce the echo signals and specifically reduce non-linear components in the echo signals. Adjustable signal delays achieve optimal performance of the linear and non-linear echo cancellers. In one inventive embodiment, each echo canceller includes a memory which stores, for each terminal in such echo canceller, data representing (a) the pseudo random sequence and (b) coefficients for adjusting the signals in such sequence. Such data for each terminal in such echo canceller is recorded in the memory for introduction to the next terminal in the memory. For each terminal in such echo canceller, the signals representing the data for the coefficient and the output from the associated adder are processed to determine an adjusted value of such coefficient for storage in the memory and for use in the next cycle of processing. The adjusted coefficient value and the data stored in the memory for such terminal are processed to produce signals for introduction to the associated adder. The signals from the second adder are processed to restore the data transmitted through the telephone line to the receiver.

42 Claims, 8 Drawing Sheets

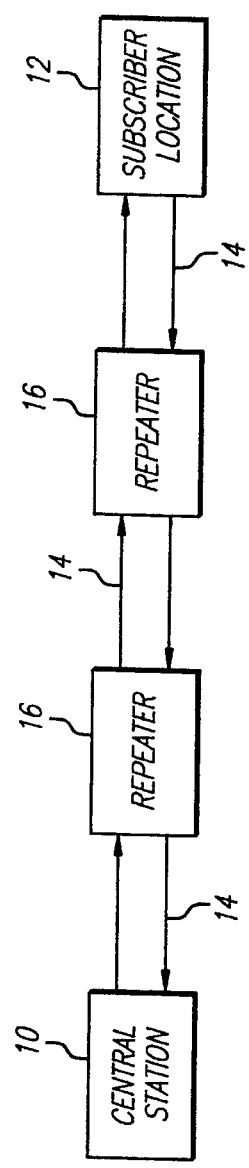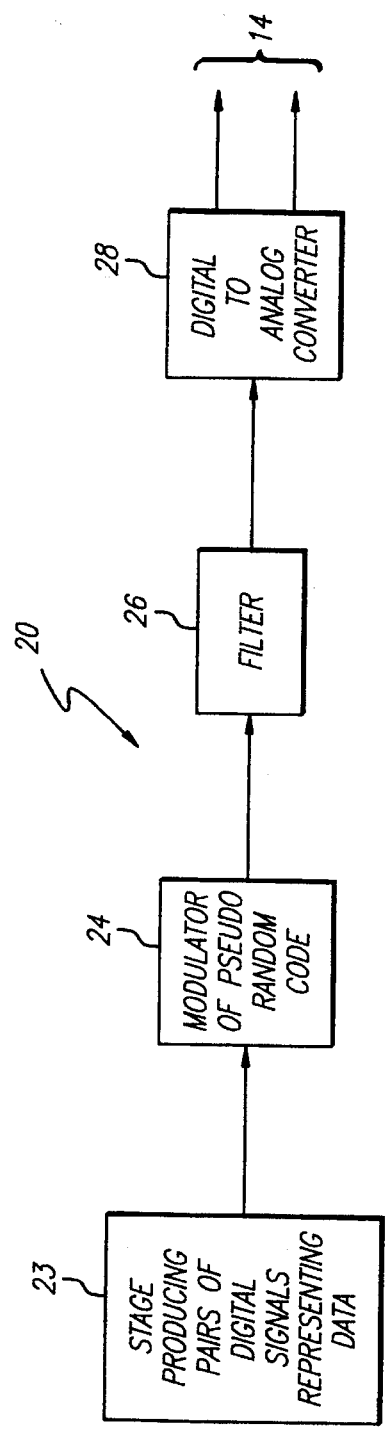

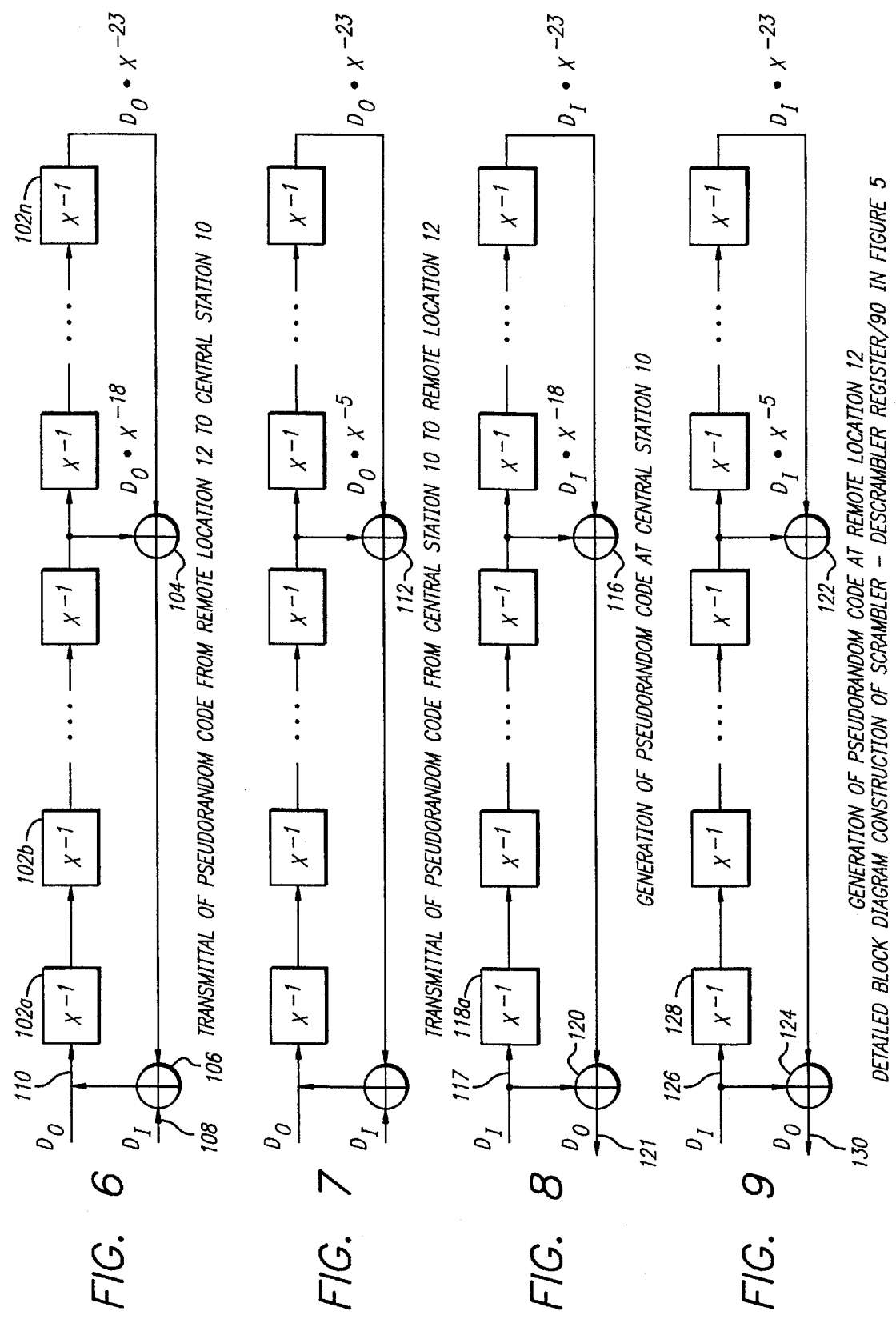

| CLOCK PHASE | COEF. READ | COEF. WRITE | RAM ADDRESS | COEF. READ | COEF. WRITE | RAM ADDRESS | COEF. READ | COEF. WRITE | RAM ADDRESS |
|---|---|---|---|---|---|---|---|---|---|
| 63 | — |    | 63 | — |    | 3  |    |    | 7  |
| 62 | — | 59 | 62 | — | 59 | 2  | —  | 59 | 6  |
| 61 | — | 58 | 61 | — | 58 | 1  | —  | 58 | 5  |
| 60 | — | 57 | 60 | — | 57 | 0  | —  | 57 | 4  |
| 59 | 59 | 56 | 59 | 59 | 56 | 63 | 59 | 56 | 3  |
| 58 | 58 | 55 | 58 | 58 | 55 | 62 | 58 | 55 | 2  |
|    |    | 54 |    |    | 54 |    |    | 54 |    |
| 8 | 8 | 4 | 8 | 8 | 4 | 12 | 8 | 4 | 16 |
| 7 | 7 | 3 | 7 | 7 | 3 | 11 | 7 | 3 | 15 |
| 6 | 6 | 2 | 6 | 6 | 2 | 60 | 6 | 2 | 14 |
| 5 | 5 | 1 | 5 | 5 | 1 | 9  | 5 | 1 | 13 |
| 4 | 4 | 0 | 4 | 4 | 0 | 8  | 4 | 0 | 12 |
| 3 | 3 | — | 3 | 3 | — | 7  | 3 | — | 11 |
| 2 | 2 | — | 2 | 2 | — | 6  | 2 | — | 10 |
| 1 | 1 | — | 1 | 1 | — | 5  | 1 | — | 9  |
| 0 | 0 | — | 0 | 0 | — | 4  | 0 | — | 8  |
|   |   |   |   | SYMBOL 0 |   |   | SYMBOL 1 |   | SYMBOL 2 |

← TIME

FIG. 11

ECHO CANCELLER

This invention relates to systems for, and methods of, passing digital data at high frequencies through copper telephone lines between a central station and subscribers serviced by the central station and recovering the data at the receiving end of the telephone lines. This invention further relates to systems for, and methods of, providing for such transmission and reception without any repeaters in the telephone lines.

Telephone systems are organized on a systematic basis. A central station is provided to service all of the subscribers within a particular radius such as approximately one (1) mile from the central station. When a subscriber serviced by the central station wishes to make a telephone call, he dials a sequence of numbers identifying the party called. Signals representing this sequence of numbers then pass through the telephone lines from the caller to the central station. The sequence of dialed numbers are then transmitted from the central station through other telephone lines to the central station of the party being called. This central station then channels the call to the telephone of the party being called.

Telephone systems have been partially upgraded in recent years. For example, optical fibers have largely replaced copper telephone lines between the central station servicing the telephone of the calling party and the central station of the party being called. This is particularly true when the call being made is a long distance call. Optical fibers are advantageous because they can transmit signals at data rates with minimal losses in power and minimal degradation in system fidelity. Optical fibers are also advantageous because they can handle a large number of different calls simultaneously without any interference between the calls.

Even though optical fibers are generally now used between different central stations, copper wires are still generally used between the central stations and the subscribers serviced by such central stations. Copper wires have inherent disadvantages. They provide relatively large power losses, particularly in relation to optical fibers. This causes the fidelity of the signals to be degraded as the signals pass through the copper telephone lines. Copper lines also provide interference between different calls travelling through adjacent copper wires. Because of these negative factors involved in the use of copper wires in telephone systems, it would be desirable to replace the copper wires with optical fibers as quickly as possible. However, this is a monumental task, particularly in view of the large number of subscribers. At the present time, it is contemplated that optical fibers will not completely replace the copper wires until well into the twenty first (21st) century.

Because of the power losses and the degradation in signal fidelity in the copper wires, repeaters have had to be disposed at spaced intervals between the central station and the subscriber. The repeaters act to boost the signals after they have deteriorated while passing through the telephone lines. As many as two (2) or three (3) repeaters have often had to be provided between the central station and the subscriber.

Repeaters are disadvantageous. They consume power and require space. Furthermore, in order to operate properly, they often are disposed below the ground (as in manholes) at displaced positions between the central station and the subscriber. The position of a repeater previously disposed below the ground for boosting the signals between the central station and a particular subscriber is often difficult to locate, particularly since the copper lines between the central station and the particular subscriber first have to be located and these lines are often disposed below ground.

The need for installing repeaters between the central station and the subscribers serviced by the central station has become magnified in recent years. This has resulted from the fact that data signals as well as voice signals have been transmitted through the copper lines in recent years. Data signals occur at higher data rates than voice signals. This has caused the power losses in the copper lines and the distortions in the fidelity of the signals transmitted through the copper lines to become magnified. Furthermore, data signals illustratively transmitted from a central station to a subscriber are reflected at the subscriber's location back to the central station. These signals interfere at the central station with the data signals transmitted from the subscriber's location to the central station and prevent the data signals from being decoded clearly. The clear decoding of data is important because errors in data are not as easily tolerated as errors in sound. For example, an error in the transmission of data representing numerical values can become considerably compounded as numerical computations involving such error progress.

In one embodiment of an invention, disclosed and claimed in application Ser. No. 08/195,628 (attorneys file D-2755) filed on Feb. 14, 1994, by Eric Paneth, Mordechai Segal, Boaz Rippin and Ehud H. Rokach for System For, and Method of, Transmitting and Receiving Through Telephone Wires Signals Representing Data, and assigned of record to the assignee of record of this application, analog signals representing individual digital values (+/−1, +/−3) pass through a telephone line to a receiver. These signals may be first provided in a pseudo random sequence. A linear echo canceller and a first adder eliminate, to an extent, echo signals resulting from second analog signals transmitted on the same telephone line by the receiver. A non-linear echo canceller and a second adder further eliminate the echo signals and specifically reduce non-linear components in the echo signals. Adjustable signal delays achieve optimal performance of the linear and non-linear echo cancellers.

In co-pending application (attorneys file D-2755), an equalizer containing four (4) different modules then compensates for signal distortions introduced by the telephone line and minimizes the effect of noise present in the telephone line. The equalizer modules are a digital gain control element, a feed forward digital filter, and two (2) feedback digital filters.

A detector module in application Ser. No. 08/195,628 (attorneys file D-2755) produces in one of several different ways at the receiver an estimate of the digital data (+/−1, +/−3) transmitted at the other end of the telephone line. The detector either extracts the digital information based on peaks in the received (non-equalized) signal, or by adding the equalized signal with preset threshold values.

A scrambler-descrambler module in application Ser. No. 08/195,628 (attorneys file D-2755) locally generates a replica of the digital symbols transmitted in analog form at the other end of the telephone line, based on a limited number (e.g. 23) of correctly detected digital values. The scrambler-descrambler module may also operate as a descrambler to recover data scrambled by the transmitter at the other end.

In one embodiment of this invention, analog signals representing individual digital values (+3, +1, −1, −3) of data pass through a telephone line to a receiver. These signals may be first provided in a pseudo random sequence. A linear echo canceller and a first adder at the receiver simultaneously eliminate, to a considerable extent, echo signals resulting from second analog signals transmitted through the telephone line by the receiver. A non-linear echo canceller and a second adder further significantly reduce the echo signals and specifically reduce non-linear components in the echo signals.

In one inventive embodiment, each echo canceller includes a member which stores signals representing for each terminal in such echo canceller (a) the pseudo random sequence and (b) coefficients for adjusting the signals in such sequence. Such data for each terminal in such echo canceller is recorded in the memory for introduction to the next terminal in the memory. For each terminal in such echo canceller, the signals representing the data from the associated adder and the output from the associated adder are processed to determine an adjusted value of such coefficient for storage in the memory and for use in the next cycle of processing. This adjusted coefficient value and the data stored in the memory for such terminal are processed to produce signals for introduction to the associated adder. The signals from the second adder are processed to restore the data transmitted through the telephone lines to the receiver.

The echo canceller of this invention also has other advantages over the prior art. It operates with only a single port, which receives the address for individual signals in the echo canceller. This is in contrast to the prior art echo cancellers, which have required two (2) ports. Furthermore, the data in the memory of the echo canceller of this invention is sampled before the signals representing such data have settled, and the sampled signals are used to write data into the memory. This has increased the data rate at which the echo canceller of this invention can operate.

In the drawings:

FIG. 1 is a simplified block diagram of a system of the prior art for transmitting signals representing digital data signals through copper lines between an individual one of a central station and a subscriber location and for receiving and decoding the digital data signals at the other one of the central station and the subscriber location;

FIG. 2 is a simplified block diagram of a transmitter disposed at the individual one of the central station and the subscriber location and included in one embodiment of the invention for transmitting signals representing digital data through copper lines to the other one of the central station and the subscriber location;

FIG. 6 is a circuit diagram in block form of a system included at the subscriber location for generating digital signals in a pseudo random code for transmission to the central station when the system shown in FIG. 5 is being used at the central station;

FIG. 7 is a circuit diagram in block form of a system included at the central station for generating digital signals in a pseudo random code for transmission to the subscriber location when the system shown in FIG. 5 is being used at the subscriber location;

FIG. 8 is a circuit diagram in block form of a system included at the central station for generating digital signals in a pseudo random code station when the system shown in FIG. 5 is being used to transmit data signals from the subscriber location to the central station;

FIG. 9 is a circuit diagram in block form of a system included at the subscriber location for generating digital signals in a pseudo random code when the system shown in FIG. 5 is being used to transmit data signals from the central station to the subscriber location;

FIG. 11 is a chart illustration of the operation of the echo canceller shown in FIG. 10.

Figure 3:
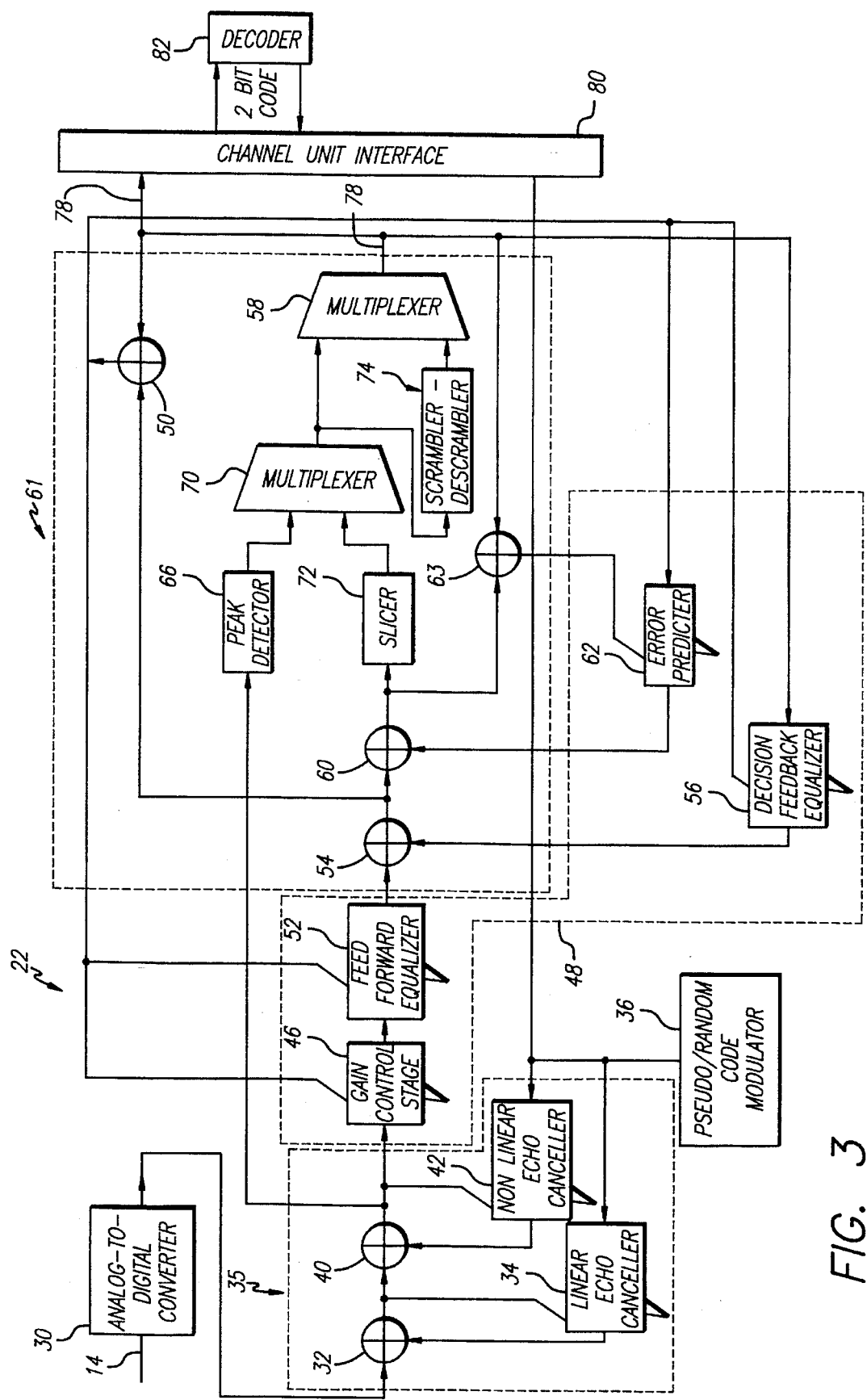
FIG. 3 is a simplified block diagram of a receiver disposed at the other one of the central station and the subscriber location and included in one embodiment of the invention.

FIG. 1 illustrates a system now in use for transmitting aural (e.g. voice) signals and data signals between a central station 10 and a subscriber's location 12. The central station 10 is able to communicate with all of the subscribers, including the subscriber 12, within a particular radius such as approximately one (1) mile from the central station. The communication generally occurs through copper lines 14. These copper lines have often been in place for many years. They have effectively transmitted voice signals between the central station 10 and the subscriber 12 but with power losses and some signal distortion.

The system shown in FIG. 1 has been relatively effective because voice signals occur at relatively low frequencies—generally to a maximum of about three thousand hertz (3 Khz). Furthermore, if there has been an occasional distortion in the signals transmitted through the copper lines, this occasional distortion has not affected the ability of the person at the receiving end to hear and understand the audio message. In other words, the subscriber is often willing to overlook minor and instantaneous distortions in the audio information that he or she receives as long as the audio information is understandable and does not appear aurally to be distorted.

In recent years, data has been transmitted through the copper lines 14 between the central station and the subscriber. This data has been transmitted through the copper lines 14 at data rates significantly higher than the frequencies of the audio information transmitted through the telephone lines. Such data has had to be received by the subscriber with considerable accuracy. For example, if the data represents numerical information, an error in the reception of such numerical information may cause subsequent numerical information derived from the numerical information with the error to be inaccurate. Sometimes an error in the reception of numerical information may even become compounded by subsequent calculations involving such numerical information that the error becomes enormous.

Since the data transmitted through the copper lines 14 is at relatively high frequencies, the power losses in the copper lines 14 increase and the distortions produced in the transmission of the data through the telephone lines also increase. To compensate for these difficulties, receivers 16 have been provided in the copper lines 14 at spaced intervals between the central station 10 and the subscriber 12. The repeaters 16 may be considered as amplifiers which restore power to the data signals and restore the high frequency components to such signals. Generally one (1) to three (3) repeaters 16 are disposed in the copper lines 14 between the central station 10 and the subscriber 12.

It has been recognized for some time that the disposition of the repeaters 16 in the copper lines 14 between the central station 10 and the subscriber 12 is not the ultimate solution to the problems discussed above. Repeaters are expensive. They also consume power. Furthermore, they provide a fair, but far from perfect, restoration of the characteristics of the signals in the lines 14. They are also disposed below ground. Because of this, it is often difficult to locate the copper lines 14 of the individual subscriber 12 and to connect one or more of the repeaters 16 in these copper lines.

Recently a system has been provided by Pairgain Technologies for operating on the data signals passing through the copper lines 14 so that the data information is transmitted with fidelity between the central station 10 and the subscriber location 12. Because of this, repeaters 16 do not have to be provided in the copper lines 14 between the central station 10 and the subscriber location 12. This system has quickly achieved considerable recognition. Units of this system are being sold in large quantities to the regional telephone companies and to other customers.

This invention provides a different system than that of Pairgain for accomplishing substantially the same results. The system of this invention is at least the equal of the system provided by Pairgain Technologies. For example, the error rate in the transmission of data signals through the copper lines 14 in this system is no greater than, and may be slightly less than, the error rate in the transmission of such data signals by the system of Pairgain Technologies. Furthermore, repeaters 16 do not have to be provided in the copper lines 14 between the central station 10 and the subscriber location 12 when the system of this invention is provided at the central station 10 and the subscriber location 12.

In one embodiment of the invention, a transmitter generally indicated at 20 in FIG. 2 and a receiver generally indicated at 22 in FIG. 3 are disposed in a composite housing at each of the central station 10 and the subscriber location 12. Generally the transmitter 20 and the receiver 22 are disposed in a common housing. However, the transmitter 20 and the receiver 22 are shown in separate Figures for purposes of clarity. The transmitter 20 includes a stage 23 which provides data signals having four (4) analog levels representing digital data values of +3, +1, −1 and −3. Each of the four (4) analog levels represents a pair of digital signals having a coded pattern individual to such analog level. This may be seen from the following table.

| Analog Value | Pattern of digital signals |
|---|---|
| +3 | 10 |
| +1 | 11 |
| −1 | 01 |
| −3 | 00 |

The digital data produced in the stage 23 to represent an individual sequence of analog values is combined as at 24 with digital signals in a pseudo random pattern of binary 1's and 0's. This pseudo random pattern is individual to the particular transmitter. For example, the transmitter 20 at the central station 10 may provide a different pseudo random code than the transmitter at the subscriber location 12. The resultant digital signals may be filtered as at 26 to pass signals only in a particular range of frequencies within the transmission capabilities of the copper lines 14. The filtered signals are converted by a digital-to-analog converter 28 to corresponding analog signals and the analog signals are transmitted through the copper lines 14. The transmitter 20 described above and shown in FIG. 2 is well known in the art. However, it is novel, at least in co-pending application Ser. No. 08/195,628 (attorneys file D-2755) when combined in a system with the receiver 22 shown in FIG. 3.

The receiver 22 shown in FIG. 3 may be considered to be included in one embodiment of the invention. The receiver 22 receives the data signals (combined with the pseudo random code) passing through the copper lines 14 from the transmitter 20. These signals are converted by an analog-to-digital converter 30 to corresponding digital signals. The digital signals are introduced to an adder or summing device 32 which compares the digital signals from the converter 30 with digital signals from a linear echo canceller 34. The linear echo canceller 34 in turn receives signals in a pseudo random code from a stage 36. The adder or summing device 32 and the linear echo canceller 34 are included in stages generally indicated at 35 for eliminating echoes from the signals received by the receiver 22. The stages 35 are enclosed within a box in broken lines.

Assume that the transmitter 20 in FIG. 2 is at the central station 10 and that the receiver 22 in FIG. 3 is at the subscriber location 12. As previously described, the pseudo random code at the central station 10 is individual to the central station and the pseudo random code at the subscriber location 12 is individual to the subscriber location. The pseudo random code at the subscriber location is combined with the digital signals representing digital data transmitted from the subscriber location 12 to the central station 10. These combined digital signals are reflected with some intensity by the transmitter 20 at the central station 10 and the reflected or echo signals are received at the receiver 22 at the subscriber location 12. Thus the digital signals received at the receiver 22 are a mixture of the digital signals (combined with a first code) transmitted from the transmitter 20 at the central station 12 and digital signals (combined in a second pseudo random code) transmitted from the subscriber location. The digital signals combined with the second pseudo random code are transmitted in analog form from the subscriber location 12 to the central station 10 and are reflected by the central station back to the subscriber location.

The linear echo canceller 34 co-operates with the adder 32 to eliminate on a coarse basis the echo or reflected signals combined with the second pseudo random code. The adder 32 removes the reflected or echo signals by simultaneously adding or subtracting a sequence of approximately one hundred and twenty eight (128) digital signals from the converter 30 and the linear echo canceller 34. The resultant signals at the output of the adder 32 are introduced back to the linear echo canceller 34 to change the coefficients at one hundred and twenty eight (128) progressive taps in the linear echo canceller.

By continuously adjusting the coefficients at the different taps in the linear echo canceller 34 in accordance with the results of the comparison in the adder or summing device 32, the linear echo canceller 34 has an optimal effect in removing any echoes or reflections from the digital signals provided by the converter. The continuous adjustments in the coefficients of the linear echo canceller 34 are indicated by a line (partially broken) at the top and bottom of the rectangle indicating the linear echo canceller). Such line extends from the output of the adder 32 diagonally through the box designated as the linear echo canceller 34 and terminates with a downwardly pointing arrow at a position just below such box. Similar arrangements are shown in other stages where continuous adjustments in coefficients are being made.

The signals from the adder 32 are introduced to another adder or summing device 40 which also receives digital signals from a non-linear echo canceller 42. The inclusion of the non-linear echo canceller 42 constitutes one of the key features of this invention, particularly in the embodiment shown in the drawings and described subsequently. The adder or summing device 40 and the non-linear echo canceller 42 are included in the stages indicated in broken lines at 35 in FIG. 3. The non-linear echo canceller 42 receives the signals from the modulator 36 in the same pseudo random code as the linear echo canceller 34. However, the non-linear echo canceller 42 has only a minimal number of (e.g. 3) of taps in comparison to the one hundred and twenty (120) taps in the linear echo canceller 34.

The signals at the taps in the non-linear echo canceller 42 are simultaneously introduced to the adder or summing device 40 to eliminate further any of the signals echoed or reflected from the transmitter 20. The output from the adder or summing device 40 is introduced to the taps in the non-linear echo canceller 42 to adjust the coefficients at the taps in such canceller. This provides for an optimal operation of the non-linear echo canceller 42 in removing at each instant the echoes or reflections received at the receiver 22 from the transmitter 20.

Since the non-linear echo canceller 42 illustratively operates with only three (3) adjustable coefficients as against illustratively one hundred and twenty (120) adjustable coefficients for the linear echo canceller 34, the non-linear echo canceller provides a further significant reduction in the echo signals passing through the telephone lines 14 from the transmitter 20 to the receiver 22. It complements the operation of the linear echo canceller by significantly reducing echo signal components that are non-linear in nature and thus are not capable of being eliminated by the echo canceller 34.

The echo canceller 42 may be constructed in a manner similar to that of the echo canceller 34. However, the use of a non-linear echo canceller such as the canceller 42 is not believed to be known in the prior art for providing a fine further significant reduction of the echo signals in the lines 14.

The digital signals from the adder or summing device 40 pass to a gain control stage 46 in an equalizer which is shown in broken lines and which is generally indicated at 48 in FIG. 3. The gain control stage 46 adjusts the gain of the digital signals from the adder or summing device 40 to a particular level. The gain control stage 46 has a plurality of taps each with an individual coefficient. These coefficients are continuously adjusted by the output signals from an adder or summing device 50. The operation of the adder or summing device 50 will be described in detail subsequently. A gain control stage with adjustable coefficients corresponding to the gain control stage 46 may be known in the prior art.

The output from the gain control stage 46 is introduced to a feed forward equalizer 50 in the equalizer 48. The feed forward equalizer 50 may be known in the prior art. It operates on the digital signals from the gain control stage 46 to eliminate the effects on each such pairs of delays from previous pairs of the digital signals in the signals received by the receiver 22. This is accomplished by providing feedbacks from the adder 50 to the feed forward equalizer 52 to adjust the coefficients at the individual ones of the plurality of taps in this equalizer.

The adjusted signals from the feed forward equalizer 52 pass to an adder or summing device 54 in the equalizer 48 as do the pairs of signals in a decision feedback equalizer 56 which is also in the equalizer 48. The decision feedback analyzer 56 may be known in the prior art. The decision feedback analyzer 56 receives from a multiplexer 58 the digital signals representing the data received by the receiver 22. The digital signals from the multiplexer 58 adjust a plurality of coefficients in the decision feedback equalizer 56 in accordance with the characteristics of these signals. The decision feedback analyzer 56 eliminates any tails on the digital signals passing through the copper lines 14 to the receiver 22 to represent data. These tails result from the differences in the responses of the copper lines to different frequencies in the digital signals representing the data.

An adder or summing device 60 receives the signals from the adder or summing device 54. The adder or summing device 60 and the multiplexer 58 are included in a detector generally indicated in broken lines at 61. The adder 60 receives digital signals from an error predictor 62 which may be known in the art and which is included in the detector 61. The error predictor 62 includes a noise predictor which operates in a well known manner upon the signals from the multiplexer 58 to eliminate noise. In eliminating such noise, the error predictor 60 converts the noise signals in an unpredictable pattern to error signals which have a predictable pattern. The error predictor 62 includes stages which eliminate the errors in the predictable pattern in such signals. The error predictor 62 has a plurality of taps with adjustable coefficients. The error predictor 62 adjusts the coefficients at these taps in accordance with the characteristics of the signals from an adder or summing device 63. These signals are produced in accordance with a comparison of the signals from the adder or summing device 60 and the multiplexer 58.

In an initial period of a few seconds, the digital signals from the transmitter 20 have a simplified pseudo random code to simplify the ability of the receiver 22 to become synchronized quickly with the operation of the transmitter 20. A synchronization as quickly as possible between the operations of the transmitter 20 and the receiver 22 is desirable so that the receiver 22 will be able to receive data thereafter from the transmitter 20. This is particularly desirable when the synchronization occurs after an interruption in the coupling through the copper lines 14 between the transmitter 20 and the receiver 22 because data cannot be transmitted between the transmitter and the receiver until such synchronization occurs. As will be appreciated, only a few seconds of difference in the synchronization between the transmitter 20 and the receiver 22 is important since the ability to transmit important data is lost during the period of non-synchronization.

The simplified pseudo random code in the transmitter 20 is provided by a pattern of signals at analog values of only +3 and −3. By providing analog values of only +3 and −3, the time for synchronizing the operations of the transmitter 20 and the receiver 22 should be minimized. The pairs of the digital signals in the simplified pseudo random code are transmitted for a period as long as seven (3) seconds but the synchronization generally occurs well before the end of this period.

Figure 4:
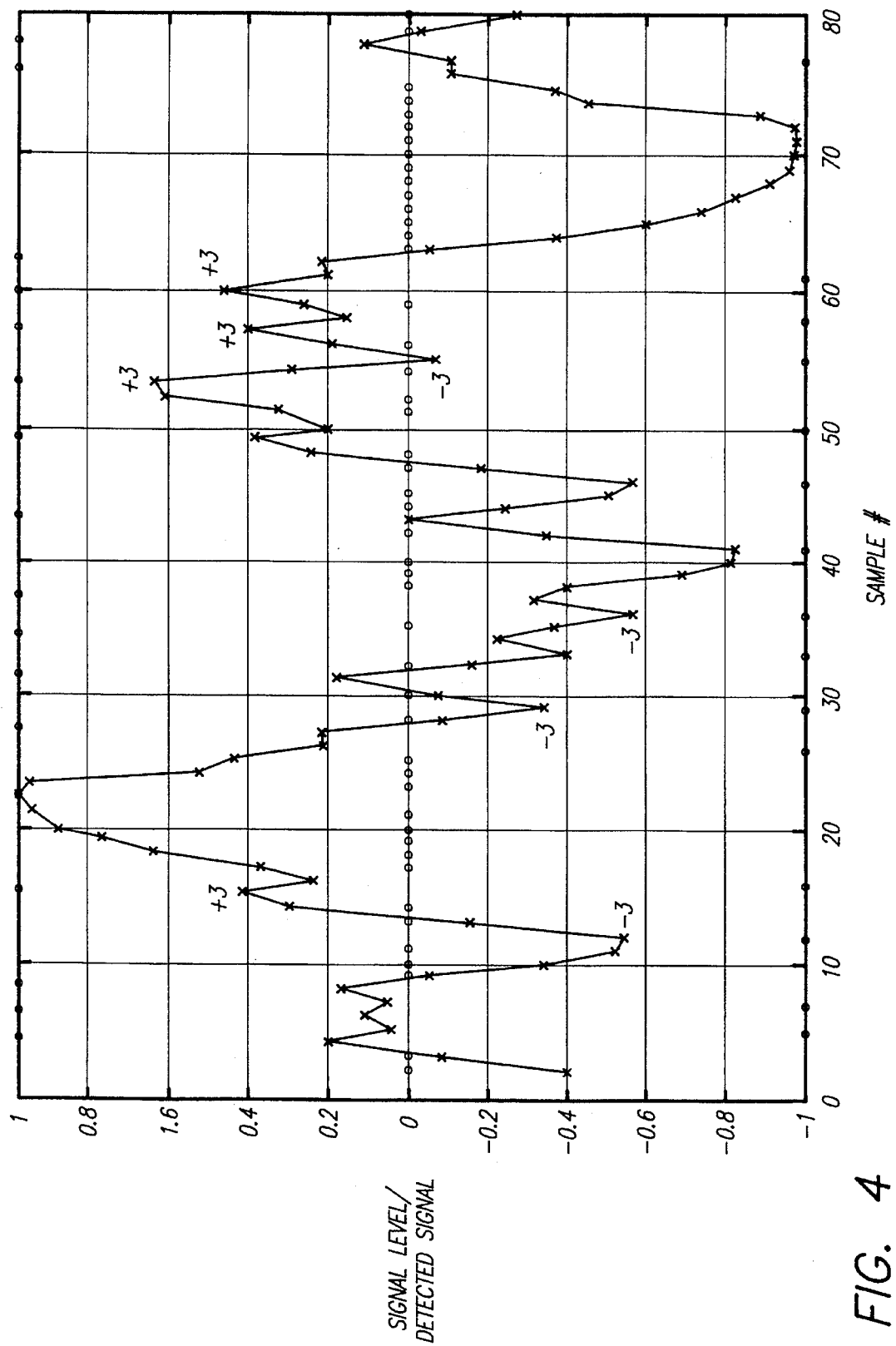
FIG. 4 illustrates a sequence of signals produced at progressive instants of time at one of the stages shown in FIG. 3.

The digital signals in the simplified pseudo random code are introduced from the adder 40 to a peak detector 66 which may be known in the prior art. The peak detector 66 is included in the detector 61. The peak detector 66 operates upon the signals from the adder or summing device 40 to detect positive and negative peaks in the patterns of these pairs of signals. Positive peaks indicate an analog value of +3 and negative peaks indicate an analog value of −3. The operation of the peak detector 66 may illustratively be seen from FIG. 4 which illustrates digital signals introduced from the adder 40 to the peak detector 66. As shown in FIG. 4, some of the positive peaks are illustratively designated in FIG. 4 as "+3". Similarly, some of the negative peaks are illustratively designated in FIG. 4 as "−3". The signals detected by the peak detector 66 to indicate analog values of +3 and −3 are introduced to a multiplexer 70 in FIG. 1. The multiplexer 70 is included in the detector 61.

The multiplexer 70 also receives digital signals from a slicer 72 which is included in the detector 61. A slicer such as the slicer 72 may be known in the prior art. During the transmission of the pairs of signals with the simplified pseudo random code, the slicer 72 determines whether the digital value of each pair of digital signals from the adder or summing device 60 is closer to an analog value of +3 or to an analog value of −3. When the digital value of a pair of digital signals is closer to any analog value of +3 than to an analog value of −3, the slicer provides the pair of digital signals with a value of +3. Similarly, the slicer 72 provides the pair of digital signals with a value of −3 when the digital signals in the pair indicate an analog value closer to −3 than to +3.

As previously described, the multiplexer 70 receives the digital signals from the peak detector 66 and from the slicer 72. The multiplexer 70 ordinarily provides a higher priority to the peak detector 66 than to the slicer 72. In other words, the multiplexer 70 passes the signals from the peak detector 66 when it simultaneously receives signals from the peak detector and the slicer. It will be appreciated that the multiplexer 70 may provide priority to the signals from the slicer 72 rather than to the signals from the peak detector 66. The signals passing through the multiplexer 70 are introduced to a scrambler-descrambler generally indicated at 74 in FIG. 1. The scrambler-descrambler 74 is included in the detector 61. The scrambler-descrambler constitutes one of the key features of the invention disclosed and claimed in co-pending application Ser. No. 08/195,628 (attorneys file D-2755).

The scrambler-descrambler 74 receives a particular number (e.g. 23) of the successive pairs of the digital signals from the multiplexer 70 and generates a sequence of successive digital signals from such particular number of the digital signals from the multiplexer. The sequence of such signals is dependent upon an algorithm corresponding to the algorithm for the simplified pseudo random code transmitted from the transmitter 20 during the initial period of synchronism of the transmitter and the receiver.

The sequence of such signals from the scrambler-descrambler 74 is compared in the adder 50 with the sequence of the signals from the multiplexer 70. This comparison continues until a particular percentage (e.g. 90%) of the signals from the scrambler-descrambler 74 and from the multiplexer 70 coincide. When this occurs, the system is considered to be in synchronization and the comparison of the signals from the scrambler-descrambler 74 and the multiplexer 70 is discontinued. The signals from the multiplexer 70 are then introduced through the multiplexer 58 to the adder or summing device 50 for comparison with the signals from the adder or summing device 54. The signals from the multiplexer 70 are also introduced through the multiplexer 58 to the gain control stage 46 and the feed forward equalizer 52 to adjust the operation of these stages.

The stage 74 also constitutes a descrambler. After the initial period when the stage 74 operates as a scrambler as described above to synchronize the operation of the transmitter and the receiver 22, the stage 74 operates as a descrambler of the signals from the multiplexer 70. In operating as a descrambler, the stage 74 removes the pseudo random code in the pairs of the digital signals representing the data from the transmitter 20 so that the digital signals passing to output lines 78 represent only the data. The signals on the output lines 78 are introduced to a channel unit interface 80 and from the interface 80 to a decoder 82 for recovering the data in the digital signals passing through the telephone lines 14.

Figure 5:
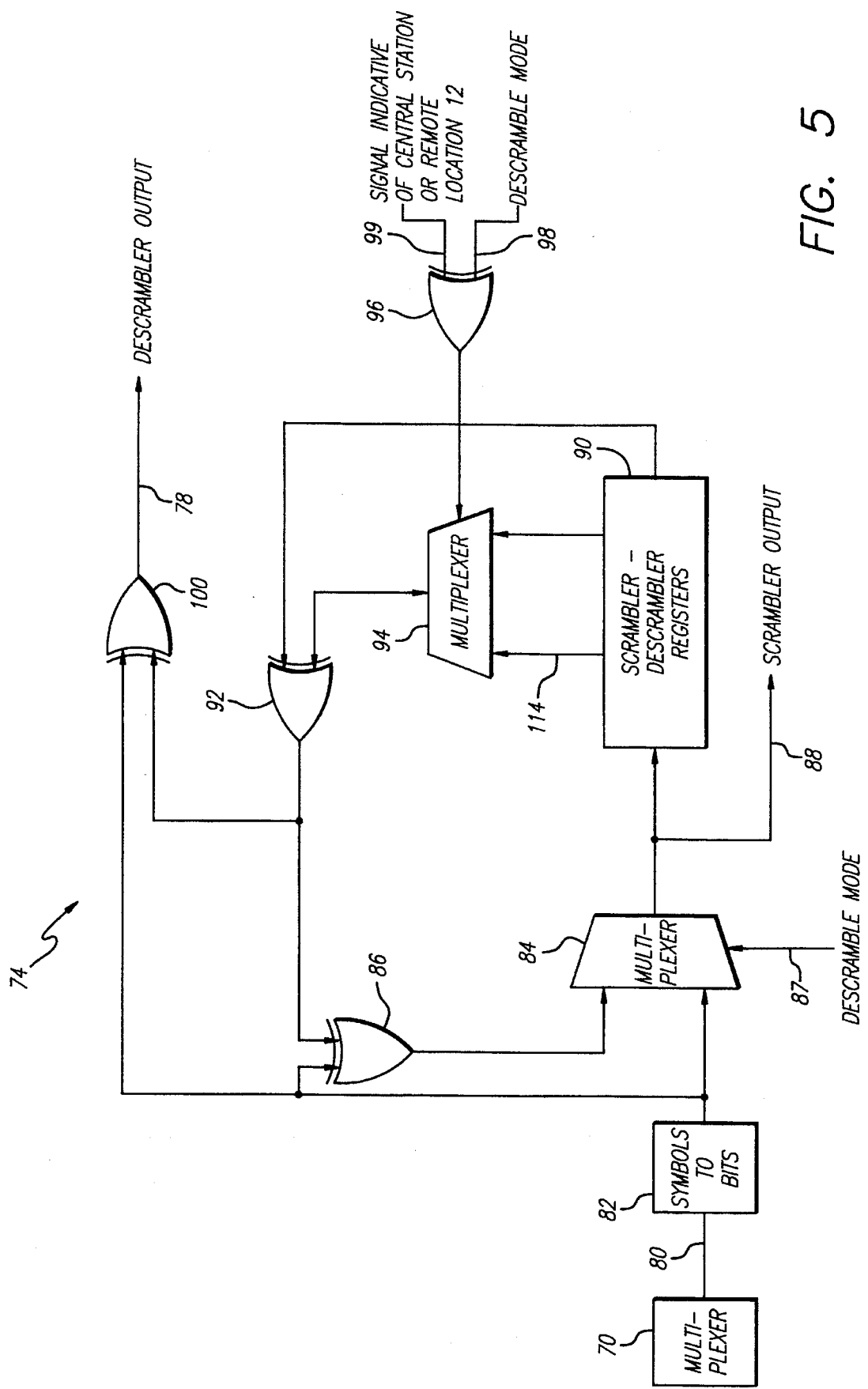
FIG. 5 is a somewhat detailed circuit diagram in block form of another of the stages shown in FIG. 3 when the stage is used as a scrambler or is used as a descrambler.

An embodiment of the scrambler-descrambler 74 is shown in FIG. 5 and is considered to be one of the novel features of the invention disclosed and claimed in application Ser. No. 08/195,628 (attorneys file D-2755). The scrambler-descrambler 74 includes lines 80 which receive the output from the multiplexer 70 (also shown in FIG. 3). The signals on the lines 80 are introduced to a stage 82 which converts parallel inputs for each pair of signals representing an analog value (+3, +1, −1, −3) to serial inputs of such signals. The output from the stage 82 is introduced to an input terminal of a multiplexer 84 having another input terminal connected to the output of an exclusive OR network 86. The multiplexer 84 also receives a control signal on a line 87 when the multiplexer is to operate in the descramble mode.

The output from the multiplexer 84 is introduced to a line 88 when the system shown in FIG. 5 is operating in the scrambler mode. In this mode, the signals on the line 88 constitute the output of the scrambler. The output from the multiplexer 84 also passes to scrambler-descrambler registers 90 when the system shown in FIG. 5 is operating either as a scrambler or a descrambler. The scrambler-descrambler register 90 operates as specialized shift registers, different embodiments of which are shown in FIGS. 6–9 and described in detail subsequently.

The scrambler-descrambler registers 90 include a plurality (e.g. 23) of flip-flops connected in a sequence. The output from the last flip-flop (e.g. flip-flop 23) is introduced to an exclusive OR network 92. The exclusive OR network 92 also receives the output from a multiplexer 94. The multiplexer 94 has two (2) inputs, one from the output of the fifth (5th) flip-flop in the scrambler-descrambler registers 90 and the other from the output of the eighteenth (18th) flip-flop in the scrambler-descrambler registers. As will be seen from the subsequent discussion, one of the outputs from the scrambler-descrambler registers 90 is effective with the operation of the registers at the central station 10 and the other output is effective with the operation of the registers at the remote location.

The multiplexer 94 also receives on a control line the output from an exclusive OR network 96. An input is provided to the exclusive OR network 96 from a line 98 which controls the operation in a descramble mode of the system shown in FIG. 5. Another input to the exclusive OR network 96 receives the signals through a line 99 from a particular one of the shift register networks shown in FIGS. 8 and 9 depending upon whether the system shown in FIG. 5 is at the central station 10 or at the subscriber location 12.

The output of the exclusive OR network 92 is common with one input terminal of an exclusive OR network 100. A second input terminal of the exclusive OR network 100 and a second input terminal of the exclusive OR network 86 receive the output signals from the stage 82. The output from the exclusive OR network 100 is introduced to the line 78 (also shown in FIG. 1) when the system shown in FIG. 5 is operating as a descrambler.

FIGS. 6 and 7 respectively indicate how the pseudo random code is generated at the transmitter 20. The system shown in FIG. 6 generates the pseudo random code at the transmitter 20 when the transmitter is at the subscriber location 12 and the receiver 22 is at the central station 10. Conversely, the system shown in FIG. 7 generates the pseudo random code at the transmitter 20 when the transmitter is at the central station 10 and the receiver 22 is at the subscriber location 12.

The system shown in FIG. 6 includes a plurality of flip-flops which may be respectively designated as 102a, 102b . . . 102n. The output of each flip-flop in the sequence is connected to the input of the next flip-flop in the sequence. In the system shown in FIG. 6, the flip-flop 102n is illustratively the twenty third (23rd) flip-flop in the sequence. The output of this flip-flop is introduced to an adder or summing device 104 as is the output illustratively from the eighteenth (18th) flip-flop in the sequence. The resultant output from the adder or summing device 104 is introduced to an adder or summing device 106 as is the input on a line 108. The output from the adder or summing device 106 in turn passes to an input line 110 which is connected to the input of the first flip-flop in the sequence.

As previously described, the system shown in FIG. 6 generates a pseudo random code at the central station when the transmitter 20 is at the subscriber location 12 and the receiver 22 is at the central station 10. The system shown in FIG. 7 is the same as the system shown in FIG. 6 except that the output of the fifth (5th) flip-flop in the sequence is illustratively connected to an adder or summing device 112 corresponding to the adder 104 in FIG. 6. The system shown in FIG. 7 generates a pseudo random code when the transmitter 20 is at the central station 10 and the receiver 22 is at the subscriber location.

The arrangements shown in FIGS. 6 and 7 and described above are well known in the art. They generate pseudo random codes by mixing the outputs of disparate pairs of flip-flops in the sequence. For example, the outputs of the eighteenth (18th) and twenty third (23rd) flip-flops in the sequence are mixed in the adder 104 in FIG. 6 and the output of the adder or summing device 104 and the signals on the line 108 are mixed in the adder 106. The signals generated are pseudo random because they are relatively long but they can be predicted (but with some difficulty because of the length of the sequence) from the values in the twenty three (23) flip-flops.

The arrangement shown in FIG. 6 produces in a pseudo random code signals which are introduced to the modulating stage 23 in the transmitter 22 of FIG. 3 when the transmitter is at the subscriber location 12. These signals modulate the data signals from the stage 23 in FIG. 2. The resultant signals are filtered in FIG. 2 and converted to analog form. The stages shown in FIG. 3 and described above recover these signals in the pseudo random code and introduce these signals to the multiplexer 70 common to FIGS. 3 and 5. The multiplexer 70 then passes these signals to the scrambler-descrambler registers 90.

FIGS. 8 and 9 illustrate the construction of the scrambler-descrambler registers 90 in FIG. 5 when the registers are at the receiver 22. The embodiment shown in FIG. 8 is operative in the receiver 22 in the central station 10 when the embodiment shown in FIG. 6 is transmitting signals in the pseudo random code from the subscriber location 12. As will be seen, the embodiment shown in FIG. 8 introduces the output from the eighteenth (18th) flip-flop to an adder or summing device 116 just as the output from the eighteenth (18th) flip-flop in FIG. 6 is introduced to the adder or summing device 104 in FIG. 6. In FIG. 8, the input is introduced through a line 117 to a flip-flop 118a constituting the first of the successive flip-flops in the shift register. The input on the line 117 and the output from the adder 116 are also introduced to an adder 120. The output from the adder or summing device 120 passes to a line 121. This is opposite to the input and output in the system shown in FIG. 6.

In like manner, the system shown in FIG. 9 is used in the receiver 22 at the subscriber location 12 when the transmitter 20 sends signals from the central station 10 to the subscriber location 12. The system shown in FIG. 9 introduces the output of the fifth (5th) flip-flop to an adder or summing device 122. This corresponds to the introduction of the output of the fifth (5th) flip-flop to the adder or summing device 112 in FIG. 7. The output from the adder or summing device 122 passes to an adder or summing device 124 as does the input on a line 126. The input on the line 126 also passes to a flip-flop 128 which constitutes the first flip-flop in a sequence. The output from the adder 124 passes to a line 130.

As shown in FIG. 5, either the output from the fifth (5th) flip-flop or the eighteenth (18th) flip-flop in the register 90 passes through the multiplexer 94 depending upon whether the scrambler-descrambler is in the receiver 22 at the central station 10 or at the subscriber location 12. The signals from the multiplexer 94 in turn pass to the exclusive OR network 92 as do the signals from the output (the 23rd flip-flop) of the registers 90. The signals from the multiplexer 94 and from the twenty third (23rd) flip-flop in the register 90 are compared in the exclusive OR network 92 such that, when one (1) (but not both) of the input signals to the multiplexer is a binary "1", a signal passes through the exclusive OR network 92 to the exclusive "OR" network 86.

The exclusive OR network 86 in turn operates on the signals from the exclusive OR network 92 and the signals from the stage 86 to pass signals to the multiplexer 84. The multiplexer 84 provides a priority in the signals from the exclusive OR network 86 over the signals from the stage 82 when the scrambler-descrambler is operating in the scrambler mode. The signals passing through the multiplexer 84 are introduced to the registers 90 after the registers 90 have received the first twenty three (23) signals from the stage 82. In this way, the registers 90 generate a code, after the first twenty three (23) signals passing through the multiplexer 70, dependent upon the characteristics from the exclusive OR network 86. The signals from the multiplexer 86 also pass to the line 88 when the scrambler-descrambler is operating as a scrambler. The signals on the line 88 pass to the multiplexer 58 (FIG. 3) which also receives the signals from the multiplexer 70. The user has an option of determining whether to grant a priority to the passage through the multiplexer 58 of the signals on the line 88 or the signals from the multiplexer 70. As previously described, the signals from the multiplexer 58 are introduced to the adder or summing device 50 for comparison with the signals from the adder or summing device 54. The resultant signals from the adder or summing device 50 adjust the coefficients at the taps in the stages 46 and 52.

After the initial period where the signals in the simplified pseudo random code (only +3, −3) pass from the transmitter 20 to the receiver 22, signals representing data are transmitted from the transmitter to the receiver. At the receiver 22, the digital signals passing through the line 80 for the successive analog values are converted by the stage 82 from a parallel representation to a series representation. The signals then pass through the multiplexer 84, which is conditioned by the signals on the line 87 to provide a priority to the signals from the stage 82 over the signals from the exclusive OR network 86.

Depending upon whether the receiver 22 is at the central station 10 or the subscriber location 12, signals pass from the registers 90 at either the output of the fifth (5th) or eighteenth (18th) flip-flops from the registers. The passage of signals through the multiplexer 94 occurs as a result of the passage through the line 98 and the exclusive OR network 92 of a signal indicating the operation in the descramble mode of the system shown in FIG. 5.

The signals passing through the multiplexer 94 are combined with the signals from the last (the 23rd) flip-flop from the registers 90. The resultant signals then pass to the exclusive OR network 100 which also receives the signals from the stage 82. The output from the exclusive OR network 100 then passes to the output line 78 as the digital indications of the data from the transmitter 20. The output from the exclusive OR network 100 also passes to the adder or summing device 50 in FIG. 3 for comparison with the output from the adder or summing device 54 as described above.

The system and method described above have certain important advantages. They assure that the echo signals at the receiver 22 are efficiently removed. This is particularly significant when it is considered that the echo signals at the receiver may often have a strength at least five hundred percent (500%) greater than the signals passing through the lines 14 to represent data. This efficient cancellation of the echo signals is provided on a first basis as by the linear echo canceller 34 and the adder or summing device 32 in FIG. 3 and on a further basis as by the non-linear echo canceller 44 and the adder or summing device 40 in FIG. 3.

The system and method described above have another important advantage. This results from the inclusion of the scrambler-descrambler stage shown in block form in FIG. 3 and on a detailed basis in FIG. 5 initially in providing a synchronous operation between the transmitter 20 and the receiver 22 in a minimal period of time. The synchronization between the transmitter 20 and the receiver 22 is facilitated by providing the pseudo random code in a minimal number (+3, −3) of analog values.

There are other advantages to the system and method described above. For example, most of the same stages in FIG. 5 are common to the operation of the operation of the scrambler-descrambler stage 74 as a scrambler in initially synchronizing the operation of the transmitter 20 and the receiver 22 or as a descrambler in reproducing the data represented by the digital signals passing through the copper lines 14 from the transmitter 20 to the receiver 22.

Figure 10:
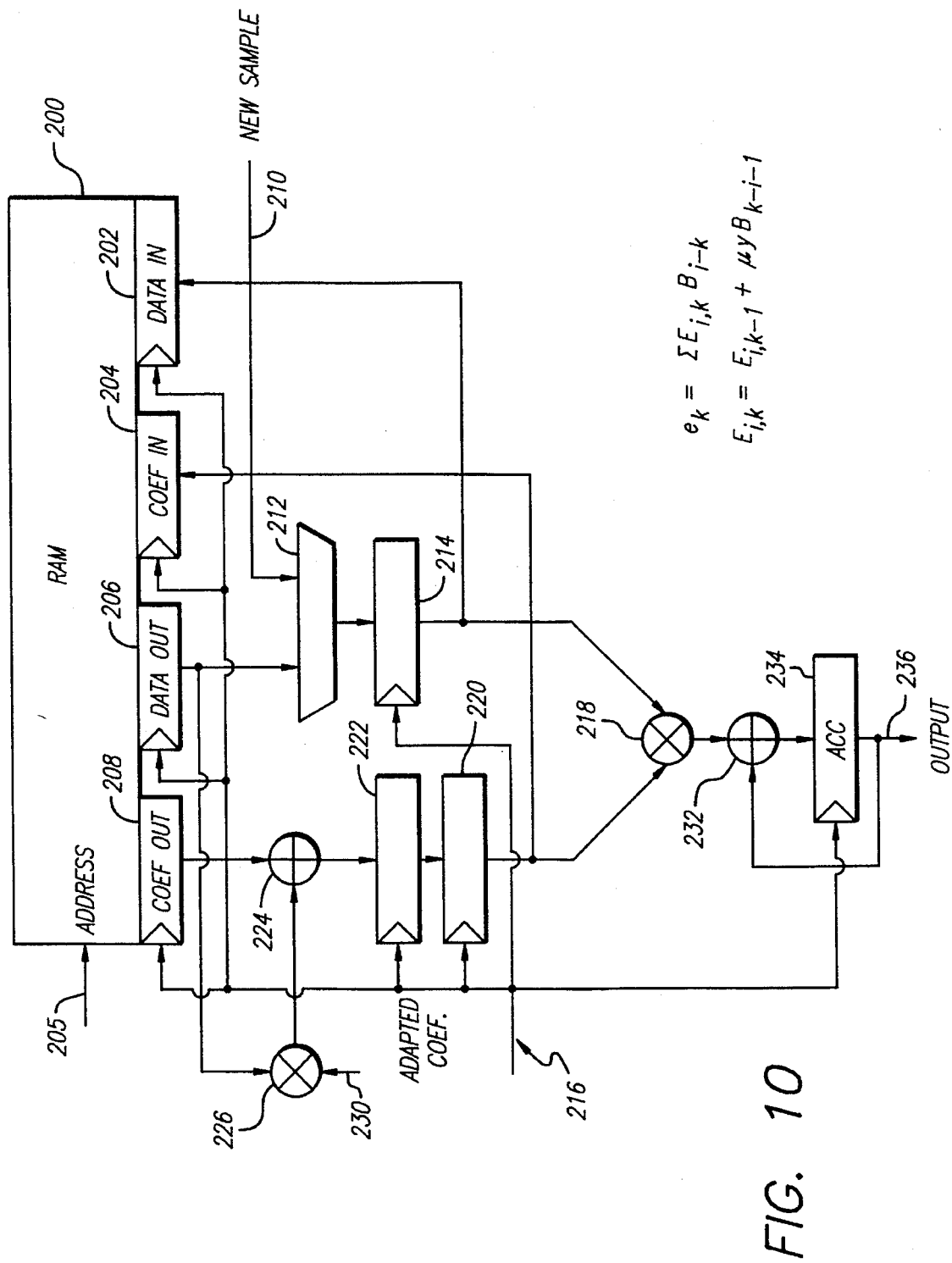
FIG. 10 is a circuit diagram, partly in block form, of an echo canceller included in the system shown in FIG. 1, such echo canceller constituting one embodiment of the invention.

FIG. 10 is a circuit diagram, partially in block form, illustrating one embodiment of the invention. The embodiment shown in FIG. 10 includes a storage memory 200 having a pair of input terminals 202 and 204. The input terminal 202 receives input data and the input terminal 204 receives input information relating to coefficients at a particular terminal in the echo canceller. The storage memory 200 also has a port 205 for introducing to the memory signals representing the coefficients and data at individual ones of the different taps or terminals in the linear echo canceller 34. The echo canceller of this invention is advantageous because it uses only the single port 205 to address the memory 204. The prior art uses more than one (1) port.

The storage memory 200 additionally has a pair of output terminals 206 and 208. The terminal 206 receives data output from the storage memory 200 and the terminal 208 receives from the storage member 200 output information relating to coefficients. As will be appreciated, the terminals 202 and 206 provide information relating to coefficients for adjusting the signals introduced to the linear echo canceller 34 and the non-linear echo canceller 42 from the pseudo random code modulator 36. As previously described, the pseudo random modulator 36 provides the code for combination with the data transmitted from the receiver to the transmitter and reflected from the transmitter back to the receiver.

The signals on a line 210 from the pseudo random code modulator 36 in FIG. 3 pass to a multiplexer 212 (FIG. 10) which also receives signals from the terminal 206 in the storage memory 200. The signals passing through the multiplexer 212 are introduced to a register 214 which synchronizes the passage of signals through the register with clock signals on a line 216. The signals from the register 214 are introduced to the terminal 202 in the storage memory 200 as the data input to the storage member. The signals from the register 214 also pass to a multiplier 218.

The multiplier 218 also receives the output from a register 220. The register 220 also introduces its output to the terminal 204 for storage in the storage memory 200 as information relating to coefficients. The operation of the register 220 is synchronized with the clock signal on the line 216 as is the operation of a register 222. The output of the register 222 is common with the input of the register 220 and the input of the register 222 is common with the output of an adder 224. The adder 224 receives inputs from the terminal 208 in the storage memory 200 and from a multiplier 226. The multiplier 226 has one (1) input terminal connected to the terminal 206 in the storage memory 200 and has another input terminal connected to a line 230.

The output from the multiplier 218 is introduced to an adder or summing device 232. The adder 232 also receives the signals from a register 234, the operation of which is synchronized with the clock signal on the line 216. The output from the register 234 is introduced as an input to the adder 232. The output from the register 234 also passes through a line 236 as an input to an individual one of the linear echo canceller 34 or the non-linear echo canceller 42.

As discussed previously, the linear echo canceller 34 has a plurality (e.g. 120) of terminals or taps. Each of these terminals receives signals from the pseudo random code modulator 36. Upon each generation of a pair of digital signals in the modulator 36 to represent an individual analog level (+3, +1, −1, −3), the pairs of signals previously generated by the modulator shift progressively to a successive terminal in the linear echo canceller 34.

Each of the terminals in the linear echo canceller has at any instant an adjustable coefficient which modifies the pseudo random signal at that instant. This adjustable coefficient shifts to the next terminal in the echo canceller 34 when the next pseudo random signal is generated in the modulator 36. At the same time, the coefficient is adjusted in accordance with the output from the adder 32.

The non-linear echo canceller 42 operates in a manner similar to the linear echo canceller 34. However, the non-linear echo canceller 42 has a significantly lower number (e.g. 3) of terminals than the linear echo canceller 34. This causes the corrections provided by the non-linear echo canceller 42 to be more precise than the corrections provided by the linear echo canceller 34. In this way, the linear echo canceller 34 can be considered to provide a coarse elimination at the receiver 22 of the signals transmitted by the receiver to the transmitter 10 and reflected by the transmitter back to the receiver. Similarly, the non-linear echo canceller 42 can be considered to provide a fine elimination of such echo signals. The resultant system provides a significantly more precise detection of the data transmitted from the transmitter 20 to the receiver 22 than the systems of the prior art.

FIG. 10 provides an illustration of the data introduced to one (1) terminal of the linear echo canceller 34 at an instant in time. It will be appreciated that a plurality of systems similar to that shown in FIG. 10 are provided for the other terminals in the linear echo canceller 34, one (1) such system being provided for each individual one (1) of the terminals in such echo canceller. It will also be seen that a plurality of systems similar to that shown in FIG. 10 are provided for the individual terminals in the linear echo canceller 42, one (1) such system being provided for each individual one (1) of the terminals in such echo canceller. To provide a basis in the claims for the linear echo canceller 34 and the non-linear each canceller 42, applicant has designated the line 236 as providing signals from the linear echo canceller 34 or the non-linear echo canceller 42 and has used this line on a generic basis for all of the different terminals in each of the echo cancellers 34 and 42.

In the embodiment shown in FIG. 10, signals are introduced to the multiplexer 212 from the output terminal 206 of the storage member 200. These signals represent a byte in the pseudo random code from the modulator 36 in FIG. 1. These signals pass to the register 214 which operates at the time of the next clock signal on the line 216 to pass the signals to the terminal 202 for recording in the storage memory 200. Four cycles later, these signals pass through the output terminal 206, the multiplexer 212 and the register 214 to the input terminal 202 of the storage member 200. The reason for the delay of four (4) cycles will be seen from the subsequent discussion.

In this way, the signals representing the pseudo random code are shifted from each terminal in the linear echo canceller 34 to the next terminal in the echo canceller upon each progressive occurrence of a clock signal on the line 216. At the last three (3) terminals of the echo canceller 34, this shift cannot occur because the shift of four (4) clock cycles is greater than the number of terminals left in the echo canceller. Because of this, a signal passes from the pseudo random code echo canceller 34 through the line 210 and the multiplexer 212 to the register 214 when the signals from the modulator 36 have been shifted to the last three (3) terminals of the echo canceller 34.

The terminal 208 in the storage memory 200 passes the coefficient from the storage member 200 for a particular terminal in the echo canceller 434. These signals are introduced to the adder or summing device 224 as are the signals from the multiplier 226. The multiplier 226 receives the signals on the line 230. These signals are provided at the output of the adder 32 for the particular terminal. They represent the error produced in the adder 32 for that particular terminal, this error being designated by the symbol y. These signals are multiplied by a constant represented by the symbol μ. The multiplier 226 multiplies the error value μy and the data B introduced to the particular terminal from the output terminal 206 of the storage member. The data B represents one of the bytes in the pseudo random code from the modulator 36.

The resultant value μyB is added in the adder 224 with the coefficient previously provided from the output terminal 208. These signals from the adder 224 are shifted in time by progressive constants of time in accordance with the clock signals introduced to the registers 222 and 220. The resultant signals at the output of the register 220 represent the new value of the coefficient for the particular terminal in the echo canceller 34. This new value for the coefficient at the particular terminals of the echo canceller 34 is recorded at the terminal 204 in the storage member 200.

The value represented by the data signals from the register 214 and the new value of the coefficient from the register 220 are multiplied in the stage 218. The resultant signals are introduced to the register 234 which synchronizes the signals with the clock signals on the line 216. The output signals from the register 234 are in turn added in the adder 232 with the signals from the multiplier 218. In this way, the adder 232 and the register 234 operate as an integrator to produce the signals cumulatively representing the signals which are introduced from the particular terminal in the echo canceller 34 to the adder 32 in FIG. 3 for comparison with the signals from the analog-to-digital converter 30.

As will be seen, there are delays of three (3) clock signals in the registers 222, 220 and 234. There is a delay of a fourth (4th) clock in the transition of the coefficient from the input terminal 204 in the storage member 200 to the output terminal 208 in the storage member. This explains why there is a delay of four (4) clock signals between the successive introduction of coefficients to the input terminal 204 of the storage member 200.

FIG. 11 constitutes a chart which illustrates how coefficients are shifted through the storage memory 200. The first column in FIG. 11 indicates the successive cycles of the clock signals on the line 216. The third column in FIG. 11 indicates the times at which successive coefficients are recorded in the memory member 200 through the terminal 204 in FIG. 10. Column 2 in FIG. 11 indicates the times at which the successive coefficients previously recorded in the memory member 200 are read from the memory member at the terminal 208. As will be seen, there is a delay of four (4) clock cycles between the time that a coefficient is recorded in the memory member 200 at the terminal 204 and is thereafter read from the memory at the terminal 208. This is indicated by wavy lines extending between clock cycle 4 in the third column and clock cycle 0 in the fifth column of FIG. 11 and by corresponding lines between the fifth (5th) and seventh (7th) columns, the sixth (6th) and eighth (8th) columns and the eighth (8th) and tenth (10th) columns.

The middle three (3) columns in FIG. 11 respectively correspond to the first three (3) columns of FIG. 11. However, the middle three (3) columns of FIG. 11 indicate the timing sequence for the next symbol after the symbol of the first three (3) columns. This may be seen from the designation of "Symbol 0" at the bottom of the second, third and fourth columns and the designation of "Symbol 1" at the bottom of fifth, sixth and seventh columns. In other words, the second, third and fourth (3) columns indicate the coefficient at a first terminal in the linear echo canceller 34 and the fifth, sixth and seventh columns indicate the coefficient at the next terminal in the linear echo canceller. In like manner, the last three (3) columns of FIG. 11 indicate the coefficient at a third (3rd) terminal directly after the first two (2) terminals in the linear echo canceller 32.

The operation of the echo canceller 34 or the echo may be seen from the following equations:

$$e_K = \Sigma E_{i,K} B_{i-k} \text{ and} \tag{1}$$

$$E_{i,K} = E_{i,K-1} + \mu B_{k-i-1}, \text{ where} \tag{2}$$

y=the error signal respectively produced at the output of the adder 32 or the adder 40 for a particular terminal in the adder and introduced to the particular terminal in the echo canceller to adjust the coefficient at that terminal;

μ=a constant indicating the adaptation gain in the error signal before the error signal is introduced to the line 230 in FIG. 10;

B=an input to the echo canceller from the pseudo random code modulator 36;

k=a particular cycle of the clock signal such as indicated at column 1 in FIG. 11;

E=the filter coefficient at the particular terminal in the echo canceller;

i=a particular filter coefficient; and e=the output at the particular terminal in the adder 34 or the adder 42.

In the above equations, the input B from the pseudo random code modulator 36 advances from one terminal to the next in the echo canceller in successive clock signals. However, the filter coefficient E for a particular terminal in the echo canceller is adjusted in each clock cycle and the adjusted coefficient is introduced to the same terminal in the next clock cycle. In the above question, the value $E_{i,k}$ is produced at the output terminal of the register 220 and is introduced to the terminal 204 in the memory member 200 as the new value of the coefficient for the terminal i in the echo canceller. The value $e_K$ represents the digital signals produced at the particular terminal (the k terminal) in the echo canceller. These signals are introduced to the adder 32 if they are produced in the linear echo canceller 34 or they are introduced to the adder 40 if they are produced in the non-linear echo canceller 42.

Figure 12:
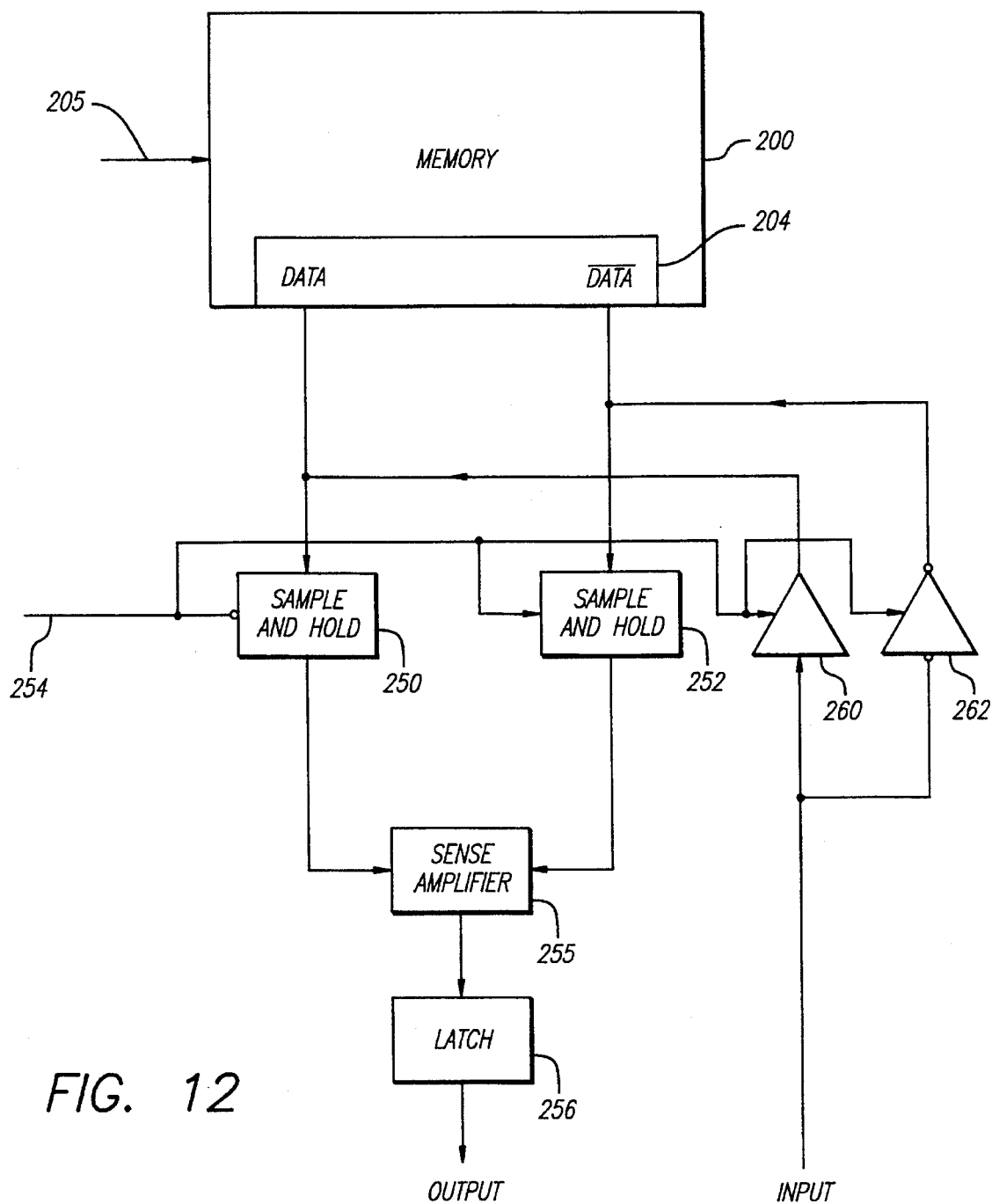
FIG. 12 is a circuit diagram, primarily in block form, of circuitry associated with the echo canceller shown in FIG. 10.

FIG. 12 indicates, primarily in block form, circuitry for reading data from the memory 204, processing the data and providing for the introduction of the processed data to the memory. Circuitry corresponding to that shown in FIG. 12 is provided for reading coefficients from the memory 200 at the terminal 204, processing the coefficients and introducing the processed coefficients to the memory. The only difference would be that the words "DATA" and "$\overline{\text{DATA}}$" would be respectively replaced by the words —COEFFICIENT— and —$\overline{\text{COEFFICIENT}}$— in such circuitry.

In the embodiment shown in FIG. 12, "DATA" and "$\overline{\text{DATA}}$" signals are respectively introduced from the memory 204 to sample-and-hold stages 250 and 252. The signals in the stages 250 and 252 are sampled at particular instants of time on a cyclic basis in accordance with timing signals introduced on a line 254 to these stages. The timing signals are provided on the line 254 before the signals in the sample-and-hold stages 250 and 252 have settled to their final values. By providing for this early sampling of the "DATA" and the "$\overline{\text{DATA}}$" signals, the rate for processing data can be enhanced. The differential signals from the sample-and-hold stages 250 and 252 pass to a sense amplifier 255. The signals from the sense amplifier 255 are latched as at 256. The signals from the latch 256 are introduced to the stage 224 in FIG. 10.

The signals from the register 214 in FIG. 10 are introduced to an amplifier 260 and an amplifier-inverter 262 in FIG. 12. The amplifier 260 and the amplifier-inverter 262 in FIG. 12 are activated by the cyclic signal on the line 254. However, the activation of the amplifier 260 and the amplifier-inverter 262 occurs at a different time in each cycle than the activation of the sample-and-hold circuits 250 and 252. The signals from the amplifier 260 and the amplifier-inverter 262 are stored in the memory 200. By activating the sample-and-hold circuits 250 and 252 at different times than the activation of the amplifier 260 and the amplifier-inverter 262, the reading of data from the memory 204 does not interfere with the writing of data into the memory and vice versa.

The echo canceller represented by the circuit diagram shown in FIG. 10 for an individual terminal in the echo canceller 34 or the echo canceller 42 and described above has certain important advantages. It uses a single storage memory 200 for storing all of the information which such echo canceller uses in processing information. Furthermore, the use of the storage memory 200 assures that the information introduced to the echo canceller will be processed properly. The echo canceller of FIG. 10 is also more simple and straightforward than the echo cancellers of the prior art. It provides a performance at least equal to any echo canceller of the prior art.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. Apparatus for use at a receiver for receiving through telephone lines from a transmitter analog signals corresponding to digital signals representing data in accordance with a plurality of analog levels and modulated in a first pseudo random code involving the analog levels, the received signals including echoes of analog signals transmitted from the receiver to the transmitter and reflected from the transmitter back to the receiver and modulated in a second pseudo random code different from the first pseudo random code, including, first means at the receiver for converting the analog signals received in the first and second pseudo random codes from the transmitter to digital signals representing the analog signals, second means at the receiver for providing digital signals modulated in the second pseudo random code, third means at the receiver, the third means being responsive to the digital signals from the second means and to the digital signals from the first means for eliminating from the digital signals from the first means the modulated digital signals reflected in the second pseudo random code from the transmitter back to the receiver, the second means including an echo canceller having a plurality of successive terminals and providing for a shift of the digital signals in the second pseudo random code from the second means to the successive terminals and having adjustable coefficients at the successive terminals for adjusting the digital signals in the second pseudo random code the third means including fourth means for comparing the digital signals from the first means and the adjusted digital signals at the successive terminals in the echo canceller to obtain digital signals representing the results of such comparison and for adjusting the digital signals representing the adjustable coefficients for the successive terminals in the echo canceller in accordance with the results of such comparison, the second means further including memory means for storing the adjusted digital signals representing the adjustable coefficients at the successive terminals in the echo canceller and for storing the digital signals from the second means.

2. Apparatus as set forth in claim 1, including, the fourth means operating upon the adjusted digital signals stored in the memory means and representing the adjustable coefficients at the successive terminals in the echo canceller and the digital signals stored in the memory means from the second means and the digital signals from the first means to obtain the adjusted digital signals representing the adjustable coefficients at the successive terminals in the echo canceller.

3. Apparatus as set forth in claim 2, including, the second means including fifth means for using the adjusted digital signals representing the adjustable coefficients stored in the memory means for the successive terminals in the echo canceller to obtain the adjustments in the adjustable coefficients at such successive terminals in an next introduction to the third means of the digital signals from the first means.

4. Apparatus as set forth in claim 1, including, sixth means for integrating the adjustments in the digital signals representing the adjustable coefficients in the successive comparisons by the fourth means to obtain the adjusted digital signals representing the adjustable coefficients in the echo canceller for an introduction to the fourth means in a next comparison by the fourth means.

5. Apparatus for use at a receiver for receiving through telephone lines from a transmitter analog signals corresponding to digital signals representing data in accordance with a plurality of analog levels and modulated with a first pseudo random code involving the analog levels, the received signals including echoes of analog signals transmitted from the receiver to the transmitter and reflected from the transmitter back to the receiver and modulated in a second pseudo random code different from the first pseudo random code, including, first means at the receiver for providing digital signals representing the analog signals received in the first and second pseudo random codes from the transmitter, second means at the receiver for providing digital signals modulated in the second pseudo random code, third means at the receiver, and including a plurality of terminals each providing adjustable digital signals representing an adjustable coefficient, for adjusting the modulated digital signals from the second means in accordance with such adjustable coefficients, fourth means at the receiver for comparing the digital signals from the first means and the signals from the plurality of terminals at the third means and for producing digital signals in accordance with such comparison to obtain adjustments in the adjustable coefficients at the third means, fifth means responsive to the digital signals from the fourth means for adjusting the digital signals representing the adjustable coefficients at the terminals in the third means, and memory means for storing the adjusted digital signals representing the adjustable coefficients at the different terminals in the third means for use by the fourth means in producing the digital signals providing for an adjustment the adjustable coefficients at the third means.

6. Apparatus as set forth in claim 5, including, sixth means for storing in the memory means the modulated digital signals from the second means for adjustment of such modulated digital signals in accordance with the adjusted digital signals representing the adjustable coefficients stored in the memory means.

7. Apparatus as set forth in claim 5, including, the fourth means providing digital signals substantially eliminating reflections of the digital signals transmitted in the second pseudo random code from the receiver to the transmitter and reflected by the transmitter to the receiver, and sixth means responsive at the receiver to the digital signals from the fourth means for reproducing the data represented by the digital signals transmitted in the first pseudo random code from the transmitter to the receiver.

8. Apparatus as set forth in claim 5, including, the echo canceller constituting a first echo canceller, sixth means at the receiver, and including a second echo canceller having a second plurality of terminals less than the first plurality with each of the second terminals providing adjustable digital signals representing an adjustable coefficient, for adjusting the digital signals from the fourth means in accordance with such adjustable coefficients, seventh means at the receiver for comparing the adjusted digital signals from the fourth means and the signals from the second plurality of terminals at the sixth means and for producing digital signals in accordance with such comparison to obtain adjustments in the adjustable coefficients at the terminals in the sixth means, and eighth means responsive to the digital signals from the seventh means for adjusting the digital signals representing the adjustable coefficients at the terminals in the sixth means, the memory means being operative to store the adjustable coefficients for the different terminals in the sixth means for use in the comparison by the seventh means.

9. Apparatus as set forth in claim 8, including, ninth means for storing in the memory means the digital signals modulated in the second pseudo random code from the second means for comparison with the digital signals from the first means, tenth means for storing in the memory means the digital signals modulated in the second pseudo random code from the second means, the seventh means providing digital signals in the first pseudo random code and substantially eliminating any reflection of the digital signals transmitted in the second pseudo random code from the receiver to the transmitter and reflected by the transmitter to the receiver, and eleventh means responsive at the receiver to the digital signals in the first pseudo random code from the seventh means for reproducing the data represented by such digital signals.

10. Apparatus for use at a receiver for receiving through telephone lines from a transmitter analog signals corresponding to digital signals representing data in accordance with a plurality of analog levels and modulated in a first pseudo random code involving the analog levels, the received signals including echoes of analog signals transmitted from the receiver to the transmitter and reflected from the transmitter back to the receiver and modulated in a second pseudo random code different from the first pseudo random code, including, first means at the receiver for providing digital signals representing the analog signals received in the first and second pseudo random codes from the transmitter, second means at the receiver for providing digital signals modulated in the second pseudo random code, third means including an echo canceller for receiving from the second means the digital signals modulated in the second pseudo random code, the third means having a plurality of terminals each providing digital signals representing an individual coefficient, memory means for storing the digital signals representing the individual coefficients at the different terminals in the third means, fourth means for adjusting the modulated digital signals from the second means in accordance with the digital signals stored in the memory means for the individual coefficients at the different terminals in the third means, fifth means for comparing the digital signals in the first pseudo random code from the first means and the adjusted modulated digital signals from the fourth means and for producing signals representing the differences in such comparison, and sixth means responsive to the signals representing the differences in the comparison from the fifth means and the digital signals from the memory means in representation of the individual coefficients at the different terminals in the third means for providing digital signals representing adjusted values of the adjustable coefficients at the different terminals in the third means and for storing such digital signals in the memory means for introduction to the fifth means in the operation of the fifth means in producing the digital signals representing the differences in the comparison.

11. Apparatus as set forth in claim 10, including, seventh means for storing in the memory means the digital signals modulated in the second pseudo random code from the second means and for introducing such stored signals to the fourth means for the adjustment of such modulated digital signals in accordance with the digital signals stored in the memory means for the individual coefficients at the different terminals in the third means.

12. Apparatus as set forth in claim 10, including, seventh means responsive to the digital signals representing the differences from the fifth means for recovering the data represented by the digital signals in the first pseudo random code from the first means.

13. Apparatus as set forth in claim 12, including, the memory means being operative to store the digital signals modulated in the second pseudo random code from the second means, the sixth means including seventh means responsive to the digital signals in the memory means in representation of the modulations in the second pseudo random code and in representation of the adjustable coefficients at the terminals in the echo canceller and responsive to the digital signals representing the digital signals from the fifth means for providing, the digital signals representing updated values of the individual coefficients at the different terminals in the third means.

14. Apparatus for use at a receiver for receiving through telephone lines from a transmitter analog signals corresponding to digital signals representing data in accordance with a plurality of analog levels and modulated in a first pseudo random code involving the analog levels, the received signals including echoes of analog signals transmitted from the receiver to the transmitter and reflected from the transmitter back to the receiver and modulated in a second pseudo random pattern different from the first pseudo random pattern, including, first means for providing digital signals representing the analog signals received in the first and second pseudo random codes from the transmitter, second means at the receiver for providing digital signals modulated in the second pseudo random code, third means including an echo canceller for receiving the digital signals modulated in the second pseudo random code from the second means, the third means having a plurality of terminals each providing digital signals representing an individual coefficient, memory means for storing the digital signals modulated in the second pseudo random code from the second means, fourth means for adjusting the digital signals in the second pseudo random code from the second means in accordance with the digital signals at the terminals in the third means, fifth means for combining the the digital signals from the fourth means and the digital signals modulated in the first and second pseudo random codes from the first means for producing digital signals representing updated values of the coefficients at the different terminals in the third means, sixth means for storing the digital signals from the fifth means in the memory means, and seventh means for combining the digital signals representing the updated values of the coefficients in the memory means and the digital signals modulated in the second pseudo random code from the memory means to produce updated digital signals representing the coefficients at the different terminals in the third means for introduction to the fourth means for combination with the digital signals in the second pseudo random code from the second means.

15. Apparatus as set forth in claim 14, including, the echo canceller in the third means constituting a first echo canceller having a first plurality of terminals each providing digital signals representing an individual coefficient, eighth means including a second echo canceller for receiving the digital signals modulated in the second pseudo random code from the second means, the eighth means having a second plurality of terminals, less than the first plurality, each of the terminals in the eighth means providing digital signals representing an individual coefficient, ninth means for adjusting the digital signals modulated in the second pseudo code from the second means in accordance with the digital signals from the terminals in the eighth means, and tenth means for combining the adjusted digital signals from the ninth means and the digital signals from the fourth means to produce digital signals representing updated values of the individual coefficients at the different terminals in the eighth means, and twelfth means for combining the digital signals from the tenth means and the digital signals stored in the memory means from the second means to produce digital signals representing the ninth means being responsive to the digital signals stored in the memory means from the tenth means and the digital signals modulated in the second pseudo random code from the second means for providing adjustments in the digital signals in the second pseudo random code from the second means.

16. Apparatus as set forth in claim 15, including, thirteenth means responsive to the digital signals from the ninth means for operating upon such digital signals to provide digital signals representing the data transmitted from the transmitter to the receiver.

17. Apparatus as set forth in claim 14, including, eighth means for processing the signals from the fourth means to provide digital signals representing the data transmitted from the transmitter to the receiver.

18. Apparatus for use at a receiver for receiving through telephone lines from a transmitter analog signals corresponding to digital signals representing data in accordance with a plurality of analog levels and modulated in a first pseudo random code involving the analog levels, the received signals including echoes of analog signals transmitted from the receiver to the transmitter and reflected from the transmitter back to the receiver and modulated in a second pseudo random code different from the first pseudo random code, including, first means at the receiver for converting the analog signals received in the first and second pseudo random code from the transmitter to digital signals representing the analog signals, second means at the receiver for providing digital signals modulated in the second pseudo random code, third means including an echo canceller for receiving the digital signals in the second pseudo random code from the second means, the third means having a plurality of terminals each providing digital signals representing an individual coefficient, the third means being operative to adjust the digital signals in the second pseudo random code from the second means in accordance with the digital signals representing the individual coefficients, fourth means for processing the digital signals in the first and second pseudo random codes from the first means and the adjusted digital signals in the second pseudo random code from the third means to produce digital signals representing differences in the values of the digital signals being processed, memory means for storing the digital signals in the second pseudo random code from the second means upon each production of the digital signals in the first and second pseudo random codes from the first means and for storing digital signals representing the coefficients at the different terminals in the third means, and fifth means responsive to the digital signals representing the differences from the fourth means and the stored digital signals representing the coefficients at the different terminals in the third means and the digital signals in the second pseudo random code from the second means for producing digital signals representing updated values of the coefficients at the different terminals in the third means and for storing such produced digital signals in the memory means as the coefficients at the different terminals in the third means.

19. Apparatus as set forth in claim 18, including, the echo canceller constituting a first echo canceller, sixth means including a second echo canceller for receiving the digital signals in the second pseudo random code from the second means, the sixth means having a plurality of terminals, less than the plurality of terminals in the third means, each of the terminals in the sixth means providing digital signals representing an individual coefficient, the sixth means being operative to adjust the digital signals in the second pseudo random code from the second means in accordance with the digital signals representing the coefficients in the sixth means, seventh means for processing the digital signals representing the differences from the fourth means and the adjusted digital signals in the second pseudo random code from the sixth means to produce digital signals representing differences in the values of the digital signals being processed, the memory means for storing the digital signals in the second pseudo random code from the second means upon each production of the digital signals from the fourth means and for storing digital signals representing the coefficients at the different terminals in the seventh means, and eighth means responsive to the digital signals representing the differences from the seventh means and to the digital signals representing the coefficients from the second memory means and to the digital signals in the second pseudo random code from the second means for producing digital signals representing updated values of the coefficients at the different terminals in the sixth means and for storing such produced digital signals in the second memory means as the coefficients at the different terminals in the sixth means.

20. Apparatus as set forth in claim 18, including, the fifth means including sixth means for operating upon the digital signals stored in the memory means in the second pseudo random code from the second means and upon the digital signals produced in the fifth means in representation of the updated values at the different terminals in the third means and upon the digital signals representing the difference from the fourth means for providing first digital signals and including seventh means for operating upon the first digital signals and the digital signals stored in the memory means in the second pseudo random code from the second means to produce the digital signals representing the individual coefficients at the different terminals of the third means.

21. Apparatus as set forth in claim 19, including, the fifth means including ninth means for operating upon the digital signals stored in the memory means in the second pseudo random code from the second means and the upon the digital signals produced in the fifth means in the representation of the updated values at the different terminals in the third means and upon the digital signals representing the difference from the fourth means for providing first digital signals and including tenth means for operating upon the first digital signals and the digital signals stored in the memory means in the second pseudo random code from the second means to produce the digital signals representing the updated values of the coefficients at the different terminals of the third means, the eighth means including eleventh means for operating upon the digital signals stored in the memory means in the second pseudo random code from the second means and upon the digital signals produced in the eighth means in representation of the updated values at the different terminals in the sixth means and upon the digital signals representing the difference from the seventh means for providing second digital signals and including twelfth means for operating upon the second digital signals and the digital signals stored in the memory means in the second pseudo random code from the second means to produce the digital signals representing the individual coefficients at the different terminals of the sixth means.

22. Apparatus as recited in claim 18, including, sixth means for operating upon the digital signals representing the differences from the fourth means for producing digital signals representing the data transmitted in the first pseudo random code from the transmitter to the receiver.

23. Apparatus as recited in claim 19, including, ninth means for operating upon the digital signals representing the differences from the seventh means for producing digital signals representing the data transmitted in the first pseudo random code from the transmitter to the receiver.

24. Apparatus for use at a receiver for receiving through telephone lines from a transmitter analog signals corresponding to digital signals representing data in accordance with a plurality of analog levels and modulated in a first pseudo random code involving the analog levels, the received signals including echoes of analog signals transmitted from the receiver to the transmitter and reflected from the transmitter back to the receiver and modulated in a second pseudo random pattern different from the first pseudo random pattern, including, first means for providing digital signals representing the analog signals received in the first and second pseudo random codes from the transmitter, second means for providing digital signals modulated in the second pseudo random code, a first echo canceller responsive to the digital signals in the second pseudo random code from the second means and having a first plurality of terminals with individual coefficients at such terminals for adjusting such digital signals in accordance with such individual coefficients, third means responsive to the digital signals in the first and second random codes from the first means and the adjusted digital signals in the second pseudo random code from the first echo canceller for producing digital signals representing the difference in the digital signals from the first means and the first echo canceller, the first echo canceller being operative to modify the digital signals representing the individual coefficients at the terminals in the first plurality in accordance with the digital signals from the third means, a second echo canceller responsive to the digital signals in the second pseudo random code from the second means and having a second plurality of terminals, less than the first plurality, with individual coefficients at such terminals for adjusting such digital signals in accordance with such individual coefficients at the second plurality of terminals, and fourth means responsive to the digital signals representing the difference from the third means and the adjusted digital signals from the second echo canceller for producing digital signals representing the difference in the digital signals from the third means and the second echo canceller, the second echo canceller being operative to modify the digital signals representing the individual coefficients at the terminals in the second plurality in accordance with the digital signals from the fourth means.

25. Apparatus as set forth in claim 24 wherein the third means combines in a first particular relationship the values represented by the digital signals in the first and second pseudo random codes from the first means and the adjusted digital signals from the first echo canceller to produce digital signals for modifying in the first echo canceler the digital signals representing the coefficients at the terminals in the first echo canceller and wherein the fourth means combines in the second particular relationship the values represented by the digital signals from the third means and the adjusted digital signals from the second echo canceller to produce digital signals for modifying in the second echo canceler the digital signals representing the coefficients at the terminals in the second canceller.

26. Apparatus as set forth in claim 25 wherein memory means are provided and wherein the digital signals in the second pseudo random code are recorded in the memory means and are thereafter reproduced from the memory means for introduction to the first and second echo cancellers and wherein the adjusted digital signals representing the individual coefficients in the first and second echo cancellers are recorded in the memory means and are thereafter reproduced from the memory means for respective introduction to the third means and the fourth means.

27. Apparatus as set forth in claim 26 wherein the third means combines in a first particular relationship the values represented by the digital signals in the first and second pseudo random codes from the first means and the adjusted digital signals from the first echo canceller to produce digital signals for adjusting the digital signals representing the coefficients at the terminals in the first echo canceller and wherein the fourth means combines in a second particular relationship the values represented by the digital signals from the third means and the adjusted digital signals from the second echo canceller to produce digital signals for adjusting the digital signals representing the coefficients at the terminals in the second canceller.

28. Apparatus for use at a receiver for receiving through telephone lines from a transmitter analog signals corresponding to digital signals representing data in accordance with a plurality of analog values and modulated in a first pseudo random code involving the analog levels, the received signals including echoes of analog signals transmitted from the receiver to the transmitter and reflected from the transmitter back to the receiver and modulated in a second pseudo random pattern different from the first pseudo random pattern, including, first means for providing digital signals representing the analog signals received in the first and second pseudo random codes from the transmitter, second means for providing digital signals modulated in the second pseudo random code, a memory, third means for recording the digital signals from the second means in the memory, an echo canceller having a plurality of terminals with individual coefficients at such terminals for modifying the digital signals in the memory in accordance with such individual coefficients, fourth means responsive to the digital signals in the first and second pseudo random codes from the first means and the modified digital signals from the echo canceller for providing digital signals representing the difference between the digital signals from the first means and the modified digital signals from the echo canceller, fifth means responsive to the digital signals from the fourth means and the digital signals representing the coefficients in the echo canceller for modifying the digital signals representing the coefficients in the echo canceller in accordance with the digital signals from the fourth means to obtain updated coefficients in the echo canceller, and sixth means for recording in the memory the modified digital signals from the fifth means for use in the fourth means of such modified digital signals from the echo canceller in providing the digital signals representing the difference between the digital signals from the first means and the modified digital signals from the echo canceller.

29. An apparatus as set fourth in claim 28, including, sixth means responsive to the digital signals from the fourth means for recovering the data represented by the analog signals transmitted in the first pseudo random code from the transmitter to the receiver.

30. An apparatus as set forth in claim 29 wherein the digital signals from the transmitter are initially in a third pseudo random code with a limited number of analog values and wherein a scrambler-descrambler is initially operative at the receiver as a scrambler to synchronize the operation of the fourth means with the signals in the third pseudo random code and wherein the digital signals from the transmitter are subsequently in the first pseudo random code and wherein the scrambler-descrambler is subsequently operative at the receiver as a descrambler to provide for the recovery of the data from the digital signals from the fourth means.

31. An apparatus as set forth in claim 29 including the fifth means being operative to combine in a particular relationship the digital signals from the fourth means and the modified digital signals recorded in the memory to obtain the modified digital signals representing the updated coefficients in the echo canceller.

32. A method at a receiver of receiving through telephone lines from a transmitter analog signals corresponding to digital signals representing data in accordance with a plurality of analog values and modulated in a first pseudo random code involving the analog levels, the received signals including echoes of analog signals transmitted from the receiver to the transmitter and reflected from the transmitter to the receiver and modulated in a second pseudo random pattern different from the first pseudo random pattern, including the steps of:

receiving from the transmitter the analog signals modulated in the first and second pseudo random codes, converting such analog signals to corresponding digital signals, providing digital signals modulated in the second pseudo random code, providing digital signals representing a plurality of coefficients in a first echo canceller, modifying the digital signals modulated in the second pseudo random code in accordance with the digital signals representing the coefficients in the first echo canceller, providing digital signals representing a first difference between the converted digital signals and the modified digital signals modulated in the second pseudo random code, modifying the digital signals representing the coefficients in the first echo canceller in accordance with the digital signals representing such first difference, providing digital signals representing a plurality of coefficients in a second echo canceller, the plurality of coefficients in the second echo canceller being less than the plurality of coefficients in the first echo canceller, modifying the digital signals modulated in the second pseudo random code in accordance with the digital signals representing the coefficients in the second echo canceller, providing digital signals representing a second difference, the second difference being between the digital signals modified in accordance with the coefficients in the second echo canceller and the digital signals representing the first difference, and modifying the digital signals representing the coefficients in the second echo canceller in accordance with the digital signals representing the second difference.

33. A method as set forth in claim 32 including the step of:

recovering the data from the digital signals representing the second difference.

34. A method as set forth in claim 32 wherein the digital signals representing the modified coefficients in the first canceller are recorded in a first memory and are subsequently read from the first memory for modifying the digital signals modulated in the second pseudo random code and wherein the digital signals representing the modified coefficients in the second echo canceller are recorded in a second memory and are subsequently read from the second memory for modifying the digital signals modulated in the second pseudo random code and wherein the digital signals modulated in the second pseudo random code are recorded in the first and second memories and are subsequently read from the first and second memories for modifying the digital signals representing the coefficients in the first and second echo cancellers.

35. A method as set forth in claim 33 wherein the digital signals from the transmitter are initially in a third pseudo random code with a limited number of analog values and wherein a scrambler-descrambler is initially operative at the receiver as a scrambler to synchronize the operation of the receiver with the digital signals in the third pseudo random code and wherein the digital signals from the transmitter are subsequently in the first pseudo random code and wherein the scrambler-descrambler is subsequently operative at the receiver as a descrambler to provide for the recovery of the data from the digital signals representing the difference between the modified digital signals in the second echo canceller and the digital signals representing the difference.

36. Apparatus as set forth in claim 15, thirteenth means for storing the digital signals from the tenth means in the memory means, the ninth means being responsive to the digital signals stored in the memory means from the tenth means and the digital signals modulated in the second pseudo random code from the second means for providing adjusted digital signals in the second pseudo random code.

37. A method at a receiver of receiving through telephone lines from a transmitter analog signals corresponding to digital signals representing data in accordance with a plurality of analog values and modulated in a first pseudo random code involving the analog levels, the received signals including echoes of analog signals transmitted from the receiver to the transmitter and reflected from the transmitter to the receiver and modulated in a second pseudo random pattern different from the first pseudo random pattern, including the steps of:

receiving from the transmitter the analog signals modulated in the first and second pseudo random codes, converting such analog signals to corresponding digital signals, providing digital signals modulated in the second pseudo random code, providing digital signals representing a plurality of different coefficients in an echo canceller, modifying the digital signals modulated in the second pseudo random code in accordance with the digital signals representing the coefficients in the echo canceller, providing digital signals representing a difference between the converted digital signals and the modified digital signals modulated in the second pseudo random code, modifying the digital signals representing the coefficients in the echo canceller in accordance with the digital signals representing such difference, recording in a memory the digital signals modulated in the second pseudo random code and the modified digital signals representing the coefficients in the echo canceller, thereafter using the digital signals recorded in the memory to provide the digital signals representing the difference between the converted digital signals and the modified digital signals modulated in the second pseudo random code.

38. A method as set forth in claim 37, including the step of:

recovering the data from the digital signals representing the difference between the converted digital signals and the modified digital signals modulated in the second pseudo random code.

39. A method as set forth in claim 37, including the step of:

thereafter modifying the digital signals representing the coefficients in the echo canceller in accordance with the digital signals thereafter representing the difference, and substituting in the memory the digital signals thereafter modified in representation of the coefficients in the echo canceller in place of the modified digital signals previously recorded in the memory.

40. A method as set forth in claim 37, including the steps of:

the echo canceller constituting a first echo canceller and the digital signals representing the difference actually being in representation of a first difference, providing digital signals representing a plurality of different coefficients in a second echo canceller, the plurality of coefficients in the second echo canceller being less than the plurality of coefficients in the first echo canceller, modifying the digital signals modulated in the second pseudo random code in accordance with the digital signals representing the coefficients in the second echo canceller, providing digital signals representing a second difference, the second difference being between the digital signals modified in accordance with the coefficients in the second echo canceller and the digital signals representing the first difference, modifying the digital signals representing the coefficients in the second echo canceller in accordance with the digital signals representing the second difference, the memory being a first memory, recording in a second memory the digital signals modulated in the second pseudo random code and the modified digital signals representing the coefficients in the second echo canceller, and thereafter using the digital signal recorded in the second memory to provide the digital signals representing the second difference.

41. A method as set forth in claim 40, including the steps of:

thereafter modifying the digital signals representing the coefficients in the first echo canceller in accordance with the digital signals thereafter representing the first difference, substituting in the first memory the digital signals thereafter modified in representation of the coefficients in the first echo canceller in place of the modified digital signals previously recorded in the first memory, thereafter modifying the digital signals representing the coefficients in the second echo canceller in accordance with the digital signals thereafter representing the second difference, and substituting in the second memory the digital signals thereafter modified in representation of the coefficients in the second echo canceller in place of the modified digital signals previously recorded in the second memory.

42. A method as set forth in claim 41, including the step of:

recovering the data from the digital signals representing the second difference.

* * * * *